(12) United States Patent
Takagi et al.

(10) Patent No.: US 6,650,552 B2
(45) Date of Patent: Nov. 18, 2003

(54) SWITCHING POWER SUPPLY UNIT WITH SERIES CONNECTED CONVERTER CIRCUITS

(75) Inventors: Masakazu Takagi, Tokyo (JP); Junichi Yamamoto, Tokyo (JP); Katsuhiko Shimizu, Tokyo (JP); Toshiyuki Zaitsu, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/152,788

(22) Filed: May 23, 2002

(65) Prior Publication Data

US 2002/0191422 A1 Dec. 19, 2002

(30) Foreign Application Priority Data

May 25, 2001 (JP) .......................................... 2001-156715
Nov. 20, 2001 (JP) .......................................... 2001-354031
Nov. 26, 2001 (JP) .......................................... 2001-358645

(51) Int. Cl.[7] ............................................ H02M 3/335
(52) U.S. Cl. .......................... 363/17; 363/65; 323/266
(58) Field of Search .......................... 323/266; 363/170, 363/65, 89

(56) References Cited

U.S. PATENT DOCUMENTS

| | | | | |
|---|---|---|---|---|
| 4,533,986 A | * | 8/1985 | Jones ........................... | 363/17 |
| 4,686,615 A | * | 8/1987 | Ferguson ..................... | 363/98 |
| 4,761,722 A | * | 8/1988 | Pruitt ........................... | 363/17 |
| 5,272,613 A | * | 12/1993 | Buthker ....................... | 323/266 |
| 5,408,403 A | * | 4/1995 | Nerone et al. ................ | 363/89 |
| 6,023,037 A | * | 2/2000 | Church et al. ................ | 363/89 |
| 6,064,580 A | * | 5/2000 | Watanabe et al. ............. | 363/17 |
| 6,181,084 B1 | * | 1/2001 | Lau .............................. | 363/89 |
| 6,344,986 B1 | * | 2/2002 | Jain et al. ..................... | 363/89 |
| 6,556,462 B1 | * | 4/2003 | Steigerwald et al. .......... | 363/89 |

OTHER PUBLICATIONS

P. Alou, et al., "Buck + Half Bridge (d = 50 %) Topology Applied to Very Low Voltage Power Converters", IEEE, Aug. 2001, 7 pages.

J. A. Cobos, et al., "New Driving Scheme for Self Driven Synchronous Recitifiers", IEEE, Oct. 1999, 7 pages.

* cited by examiner

*Primary Examiner*—Jeffrey Sterrett
(74) *Attorney, Agent, or Firm*—Oblon, Spivak, McClelland, Maier & Neustadt, P.C.

(57) ABSTRACT

A switching power supply unit of the present invention a timing generating circuit (121) which receives a first control signal formed by a rectifier-transistor driving circuit (104), forms a second control signal based on the first control signal, and supplies the second control signal to a control electrode of the rectifier transistor (113).

The first control signal is synchronized with the switching operation of a half-bridge circuit (102), and the second control signal exceeds a threshold voltage of a rectifier transistor (113) at a timing substantially equal to the timing that one edge of the first control signal is generated and falls below the threshold voltage of the rectifier transistor (113) at a timing earlier by predetermined time than the timing that the other edge of the first control signal is generated.

5 Claims, 17 Drawing Sheets

US 6,650,552 B2

SWITCHING POWER SUPPLY UNIT WITH SERIES CONNECTED CONVERTER CIRCUITS

BACKGROUND OF THE INVENTION

The present invention relates to a switching power supply unit, and more particularly to a synchronous rectifying switching power supply unit, a switching power supply unit having a half-bridge circuit, and a switching power supply unit using a plurality of converters connected in series.

(Related Art 1)

Conventionally, DC/DC converters are known as a switching power supply unit. A typical DC/DC converter converts an alternating current input to direct current once by using a switching circuit, then transforms (boosting or lowering) the voltage by using a transformer, and further converts the direct current to alternating current by using an output circuit, whereby alternating current output having voltage different from the input voltage can be obtained.

In some cases, switching elements such as transistors are employed in an output rectifier for use in the DC/DC converter, so that the switching elements may be synchronously controlled with the switching circuit on the input side. The DC/DC converter having such an output rectifier is generally called as a synchronous rectifying switching power supply unit.

FIG. 15 is a circuit diagram of a conventional synchronous rectifying switching power supply unit.

As shown in FIG. 15, the conventional switching power supply unit includes a transformer 1, a half-bridge circuit 2 provided on the primary side of the transformer 1, a rectifier circuit 3 provided on the secondary side of the transformer 1, a rectifier-transistor driving circuit 4 provided on the secondary side of the transformer 1, a smoothing circuit 5 provided at the following stage of the rectifier circuit 3, and a control circuit 9 for controlling on/off of a first main switch 7 and a second main switch 8 provided in the half-bridge circuit 2 based on the result of monitoring output voltage Vo via an insulating circuit 6.

The half-bridge circuit 2 includes a first input capacitor 11 and a second input capacitor 12 connected in series between both ends of an input power supply 10 in addition to the first and second main switches 7 and 8. The primary winding 20 of the transformer 1 is connected between a node where the first and second main switches 7 and 8 are joined and a node where the first and second input capacitors 11 and 12 are joined. The rectifier circuit 3 has a first rectifier transistor 13 and a second rectifier transistor 14. The drain of the first rectifier transistor 13 is connected to the first secondary winding 21 of the transformer 1, whereas the drain of the second rectifier transistor 14 is connected to the second secondary winding 22 of the transformer 1. As shown in FIG. 15, as the source of the first rectifier transistor 13 and the source of the second rectifier transistor 14 are short-circuited, a voltage waveform appearing between the common source node of both transistors and a node where the first and second secondary windings 21 and 22 of the transformer 1 are joined forms an output from the rectifier circuit 3. The rectifier-transistor driving circuit 4 has a first diode 15 connected between the gate and source of the second rectifier transistor 14 and a second diode 16 connected between the gate and source of the first rectifier transistor 13. The third secondary winding 23 of the transformer 1 is connected between the cathode of the first diode 15 and the cathode of the second diode 16. Further, the smoothing circuit 5 has a smoothing inductor 17 and a smoothing capacitor 18.

With the arrangement above, the first and second main switches 7 and 8 are turned on alternately under the control of the control circuit 9 at intervals of predetermined dead time, whereby the output voltage Vo determined by the input voltage Vin and the turn ratio of the transformer 1 is applied to a load 19.

FIG. 16 is a timing chart showing the operation of the conventional synchronous rectifying switching power supply unit. In FIG. 16, Vgs7 and Vgs8 mean the gate-source voltages of the first and second main switches 7 and 8 respectively; Vds13 and Vds14 mean the source-drain voltages of the first and second rectifier transistors 13 and 14 respectively; and Vgs13 and Vgs14 means the gate-source voltages of the first and second rectifier transistors 13 and 14 respectively.

As shown in FIG. 16, in the conventional synchronous rectifying switching power supply unit, the first and second main switches 7 and 8 are driven alternately under the control of the control circuit 9 at intervals of predetermined dead time, and in response to the operation, the secondary voltage is generated across the source and drain of the second rectifier transistor 14 during the interval the first main switch 7 is "on", whereas the secondary voltage is generated across the source and drain of the first rectifier transistor 13 during the interval the second main switch 8 is "on".

In this case, in the rectifier-transistor driving circuit 4, the first diode 15 is turned on during the interval the first main switch 7 is "on" and the second diode 16 is turned on during the interval the second main switch 8 is "on". Consequently, during the interval the first main switch 7 is "on", the gate-source channel of the first rectifier transistor 13 is driven and turned on, and during the interval the second main switch 8 is "on", the gate-source channel of the second rectifier transistor 14 is driven and turned on. Further, as the gate of the first rectifier transistor 13 and the gate of the second rectifier transistor 14 are short-circuited via the third secondary winding 23 of the transformer 1 during the interval the first and second main switches 7 and 8 both are "off", the gate-source voltages of the first rectifier transistor 13 and the second rectifier transistor 14 each become intermediate voltages.

As the first rectifier transistor 13 is turned on during the whole interval the second main switch 8 is "off" and as the second rectifier transistor 14 is turned on during the whole interval the first main switch 7 is "off", no current is practically allowed to flow into the body diode of the first rectifier transistor 13 and the body diode of the second rectifier transistor 14, so that rectification can be carried out with a small loss.

(Related Art 2)

There have been proposed so-called two-stage converters for electronic systems like computers and as one example of a switching power supply unit for efficiently and stably supplying voltage, a preceding-stage buck converter and a following-stage half-bridge converter are combined in such a two-stage converter.

The buck converter is used for stepping down input voltage to a certain voltage level, whereas the half-bridge converter employs a half-bridge circuit for converting the input voltage to AC voltage, insulating, rectifying and smoothing the AC voltage to generate DC voltage.

A rectifying-smoothing circuit comprises a self-drive type synchronous rectifying circuit formed with a synchronous rectifying switch element connected to the secondary winding side of a transformer, capacitors and an inductor.

As described in a document under the title of "Buck+ Halfbridge (d=50%) Topology Applied to very Low Voltage Power Converters" by P. Alou, J. Oliver, J. A. Cobos, O. Garcia and J. Uceda in the IEEE Applied Power Electronics Conference (APEC), 2001, a two-stage converter arrangement is made through the steps of fixing to 50% the duty ratio of a main switch element provided in a following-stage half-bridge converter and controlling the duty ratio of a switching element provided in a preceding-stage buck converter so as to make the duty ratio of the switching element variable in accordance with output voltage.

(Related Art 3)

There has been proposed a technique recently for exciting the primary winding of a transformer by using a half-bridge circuit, wherein a buck converter circuit and the half-bridge circuit are connected in series as the primary circuit of a switching power supply unit; and the buck converter circuit is used to step down input voltage Vin and supply the input voltage thus stepped down to the half-bridge circuit (Buck+ Half Bridge (d=50%) Topology applied to Very Low Voltage Power Converters, IEEE APEC, 2001, Session 19.4).

When these circuits above are used as the primary circuit of the switching power supply unit, control is exerted so that the duty of a switching element provided in the half-bridge circuit is fixed to a predetermined quantity and that the duty of a switching element provided in the buck converter circuit is set to a predetermined quantity according to output voltage Vo. As comparatively low voltage is thus obtainable efficiently and stably as the output voltage Vo, this switching power supply unit is most suitable usable as a power supply for computers, for example.

FIG. 17 is a circuit diagram of a conventional switching power supply unit having such a primary circuit as described above.

As shown in FIG. 17, the conventional switching power supply unit includes a transformer 51, a buck converter circuit 53 connected to an input power supply 52, a half-bridge circuit 54 that is connected to the buck converter circuit 53 and used for exciting the primary winding of the transformer 51, a rectifier circuit 55 provided on the secondary side of the transformer 51, a smoothing circuit 57 provided at the following stage of the rectifier circuit 55 and connected to a load 56, and a control circuit 63 for monitoring output voltage Vo via an insulating circuit 58 and performing on/off control over a first and a second main switch 59 and 60 provided in the buck converter circuit 53 according to the monitored result and performing on/off control over a third and a fourth main switch 61 and 62 provided in the half-bridge circuit 54.

The buck converter circuit 53 has an inductor 64 in addition to the first and second main switches 59 and 60; the half-bridge circuit 54 has a first and a second input capacitor 65 and 66 connected in series across the output terminal of the buck converter circuit 53 in addition to the third and fourth main switches 61 and 62; and the primary winding of the transformer 51 is connected between a node where the third and fourth main switches 61 and 62 are joined and a node where the first and second input capacitors 65 and 66 are joined. Further, the rectifier circuit 55 has a first and a second diode 67 and 68; and the smoothing circuit 57 has a smoothing inductor 69 and a smoothing capacitor 70. The rectifier circuit 55 and the smoothing circuit 57 constitute an output circuit.

With the arrangement above, the first and second main switches 59 and 60 provided in the buck converter circuit 53 are alternately turned on with predetermined dead time held therebetween under control of the control circuit 63, whereby the constant internal voltage Vin2 determined by the duties of input voltage Vin1 and the first and second main switches 59 and 60 appears across the output terminal of the buck converter circuit 53. On the other hand, the third and fourth main switches 61 and 62 provided in the half-bridge circuit 54 are alternately turned on/off with a predetermined quantity of duty under control of the control circuit 63. Thus, the constant output voltage Vo determined by the internal voltage Vin2 and the turn ratio of the transformer 51 is given across the load 56.

Regarding the first related art, what has been described above refers to ideal operation, and in actual circuits, there unavoidably occurs a slight delay in the timing of operations of the first rectifier transistor 13 and the second rectifier transistor 14. Ideally, the first rectifier transistor 13 is turned off simultaneously at the timing (time t0) the secondary voltage is generated across the source and drain of the secondary rectifier transistor 13, and the second rectifier transistor 14 is turned off simultaneously at the timing (time t1) the secondary voltage is generated across the source and drain of the secondary rectifier transistor 14. Actually, however, the timing the first rectifier transistor 13 is turned off slightly delays behind the time t0 and the timing the second rectifier transistor 14 is turned off slightly delays behind the time t1.

For the reason above, a through current flows into the first rectifier transistor 13 in a brief interval of time after the secondary voltage is generated across the source and drain of the first rectifier transistor 13, and similarly, through current flows into the second rectifier transistor 14 in a brief interval of time after the secondary voltage is generated across the source and drain of the second rectifier transistor 14. The through currents result in power loss and the problem is that the lowering of conversion efficiency is caused to the whole switching power supply unit.

In the two-stage converter as described in the second related art, current flowing through a synchronous rectifying switch element on the secondary winding side of a transformer is caused to have a commutation period due to the leakage inductance of the transformer provided in the half-bridge circuit and then voltage is generated across both ends of the synchronous rectifying switch element.

In case where the commutation period is longer than delay in the operation of the synchronous rectifying switch element (turn on/off period), through current flows as the synchronous rectifying switch elements are simultaneously turned on and the synchronous rectifying switch elements may be damaged when the worst comes to the worst.

Particularly in the case of a low ON resistant synchronous rectifying switch element, operation-delay time tends to become longer, this phenomenon appears conspicuously.

Although this problem can be dealt with by coarsely coupling the transformer in order to increase the leakage inductance and prolong the commutation period. However, power loss may increase caused by the increase of the interval that the synchronous rectifying switch element cannot be turned on, and further, there may be brought about a bad influence resulting from an increase in loss because of the leakage inductance and spike noise.

The synchronous rectifying switch elements can be prevented from being simultaneously turned on by adding to the half-bridge circuit a drive timing circuit for controlling the timing that the synchronous rectifying switch element is operated. However, the problem in this case is that a switching power supply unit tends to become large-sized accompanied with an increase in cost as the number of parts increases.

Regarding the third related art, a user may be requested to be able to switch the values of the output voltage Vo in order to have different kinds of loads driven by one kind of switching power supply unit. In case where the user is allowed to switch the output voltage Vo between 3.3V and 1.5V, a step-down range to be covered by the buck converter circuit 3 as the first stage converter grows larger, and the load of the buck converter circuit 3 is heavy when lower voltage (e.g., 1.5V) is required as the output voltage Vo, and the problem is that loss tends to increase.

In case where a lower value of the output voltage Vo is set by the user, the output voltage Vo can be lowered by reducing not only the duty of the buck converter circuit 3 but also the duty of the half-bridge circuit 4 as a second stage converter. In this case, however, the stability of the output voltage Vo may be ruined because a plurality of converters operate to stabilize the output voltage Vo. In order to prevent the stability of the output voltage Vo from being ruined, the converter-to-converter operation needs to be properly regulated, which results in complicating the control operation. Particularly when transistors as rectifying elements constituting a rectifier circuit are used and turned on/off by utilizing the secondary voltage of the transformer 1, the loss produced in the rectifier circuit tends to increase because the dead time of the half-bridge circuit 4 fluctuates as the duty of the half-bridge circuit 4 fluctuates. In case where the duty of the half-bridge circuit 4 is lowered in response to a demand for lower voltage (e.g., 1.5V) as the output voltage Vo, the dead time of the half-bridge circuit 4 increases, whereby the interval during which no voltage is generated on the secondary side of the transformer 1 becomes longer. Consequently, as the conducting period of the rectifier transistors constituting the rectifier circuit becomes shortened, current is allowed to flow into the body diodes over a long period of time.

SUMMARY OF THE INVENTION

It is therefore an object of the invention to provide a switching power supply unit adapted to effectively prevent the generation of through currents.

Another object of the invention is to provide a switching power supply unit capable of substantially improving the reliability of a self-drive type secondary rectifier circuit and also forming a highly efficient power supply at low cost.

Still another object of the invention is to provide a switching power supply unit which uses a plurality of converters connected in series and is capable of properly switching output voltage Vo from a high level to a low level.

Another object of the invention is to provide a switching power supply unit which uses a plurality of converters connected in series and is capable of switching output voltage Vo from a high level to a lower under a simple type of control.

Still another object of the invention is to provide a switching power supply unit which uses a plurality of converters connected in series and is capable of switching output voltage Vo from a high level to a lower level while suppressing an increase in the loss generated in a rectifier circuit.

The object of the invention is accomplished by a switching power supply unit comprising a transformer, a switching circuit provided on the primary side of the transformer, a synchronous rectifier circuit which is provided on the secondary side of the transformer and has at least a rectifier transistor, a rectifier-transistor driving circuit which is provided on the secondary side of the transformer and forms a first control signal synchronous with the switching operation of the switching circuit, and a timing generating circuit for forming a second control signal which exceeds the threshold voltage of the rectifier transistor at a timing substantially equal to the timing one edge of the first control signal is generated on receiving the first control signal and which falls below the threshold voltage of the rectifier transistor at a timing earlier by predetermined time than the timing the other edge of the first control signal is generated and for supplying the resulting second control signal to the control electrode of the rectifier transistor.

As the off timing of rectifier transistor is hastened by the timing generating circuit according to the invention, the generation of through currents can effectively be prevented, whereby the conversion efficiency of the whole switching power supply unit is enhanced because power loss is reducible.

According to an embodiment of the invention, the waveform of the first control signal is a waveform alternately repeating a first potential, a second potential and an intermediate potential inserted in between the first and second potentials, the one edge of the first control signal being defined by the timing the one edge varies from the first potential to the intermediate potential, the other edge of the first control signal being defined by the timing the other edge varies from the intermediate potential to the first potential.

According to another embodiment of the invention, during the interval the first control signal varies from the intermediate potential to the first potential after the first control signal varies from the second potential to the intermediate potential, the voltage of the second control signal falls below the threshold voltage of the rectifier transistor.

According to another embodiment of the invention, the timing generating circuit includes first means for, on receiving the first control signal, forming an intermediate signal which varies from a first logical level to a second logical level in response to the one edge of the first control signal and varies from the second logical level to the first logical level in response to the variation of the first control signal from the second potential to the intermediate potential; and second means for, on receiving the intermediate signal, forming the second control signal by providing a delay to the variation of the intermediate signal from the second logical level to the first logical level.

According to another embodiment of the invention, the first means includes a divider circuit for dividing the first control signal, a delay circuit for delaying the output signal of the divider circuit, and a comparator for comparing the first control signal with the output signal of the delay circuit whereby to form the intermediate signal.

According to another embodiment of the invention, the delay circuit includes a first time-constant circuit for providing a delay to the one-directional variation of the output signal of the divider circuit, and a second time-constant circuit for providing a delay to the reverse-directional variation of the output signal of the divider circuit.

According to another embodiment of the invention, the time constant of the first time-constant circuit is set so that the potential of the output signal of the delay circuit rises above at least the intermediate potential at the timing the first control signal varies from the second potential to the intermediate potential and wherein the time constant of the second time-constant circuit is set so that the potential of the output signal of the delay circuit falls below at least the intermediate potential at the timing the first edge of the first control signal is generated.

According to another embodiment of the invention, the switching circuit is one selected from a half-bridge circuit, a full-bridge circuit, a push-pull circuit and an active clamping circuit.

The object of the invention is accomplished further by the switching power supply unit comprising a switching circuit which is connected to an input power supply and has a first and a second main switch which alternately conduct at intervals of dead time, a first rectifier transistor for performing rectifying operation during the interval the second main switch remains non-conducting and a second rectifier transistor for performing rectifying operation during the interval the first main switch remains non-conducting, and means for driving the first and second rectifier transistors, wherein the means is used to supply an ON signal to the control electrode of the first rectifier transistor over the substantially whole period of first dead time to be inserted and also to supply the ON signal to the electrode of the second rectifier transistor for a part of period of the first dead time when the conducting main switch is switched from the second main switch to the first main switch and wherein the means is used to supply the ON signal to the control electrode of the second rectifier transistor over the substantially whole period of second dead time to be inserted and also to supply the ON signal to the electrode of the first rectifier transistor for a part of period of the second dead time when the conducting main switch is switched from the first main switch to the second main switch.

Even according to this invention, the generation of through currents can effectively be prevented, whereby the conversion efficiency of the whole switching power supply unit is enhanced because power loss is reducible.

According to an embodiment of the invention, a part of period of the first dead time is a consecutive period including the timing of starting the first dead time and wherein a part of period of the second dead time is a consecutive period including the timing of starting the second dead time.

In order to solve the foregoing problems, a switching power supply unit according to the invention includes a first and a second switching element which are provided on the primary winding side of a transformer and connected to a power supply in series, a converter having a first and a second synchronous rectifying switch element which are connected to the secondary winding side of the transformer in series, and a driving circuit for controlling the operation of the first and second switching elements and generating a first and a second control signal having a dead time period in which the first and second switching elements are not conducting.

According to the invention, since the first and second synchronous rectifying switch elements can surely be prevented from being simultaneously turned on and since the commutation derived from the leakage inductance of the transformer can be controlled in an optimum manner, it becomes possible to materialize low-cost, reliable and low-cost switching power supply unit.

The object of the invention is accomplished by a switching power supply unit including a transformer, a first and a second converter connected between a supply input terminal and the primary winding of the transformer in series, an output circuit connected to the secondary winding of the transformer, and control circuits for controlling the operation of the first and second converters, wherein the control circuits are used for controlling the first converter in terms of duty and also controlling the second converter in terms of frequency.

According to the invention, the first converter is controlled in terms of duty, whereas the second converter is controlled in terms of frequency, whereby even when switching of output voltage is requested by a user, the switching operation can simply be controlled.

According to an embodiment of the invention, the control circuit controls the duty of the first converter according to the present output voltage outputted from the output circuit and controls the operating frequency of the second converter according to the set value of the present output voltage, regardless of the present output voltage.

According to another embodiment of the invention, as the first converter and the second converter share their roles with each other, it is unnecessary to coordinate both the converters closely.

According to another embodiment of the invention, further, the control circuit controls the second converter so that dead time is made constant, regardless of the operating frequency.

According to the another embodiment of the invention, further, a self-drive type synchronous rectifier circuit formed with rectifier transistors is contained in the output circuit and wherein the dead time is set substantially equal to an interval resulting from subtracting a commutation period due to leakage from the transformer from delay time in the operation of the rectifier transistors.

According to another embodiment of the invention, further, the loss generated in the output circuit can effectively be suppressed while through current is prevented from being generated.

According to another embodiment of the invention, further, the first converter is a buck converter circuit and the second converter is a half-bridge circuit.

DETAILED DESCRIPTION OF THE PREFERRED EMBODIMENT

The preferred embodiments of the invention will now be described with reference to the accompanying drawings.

(Embodiment 1)

Figure 1:
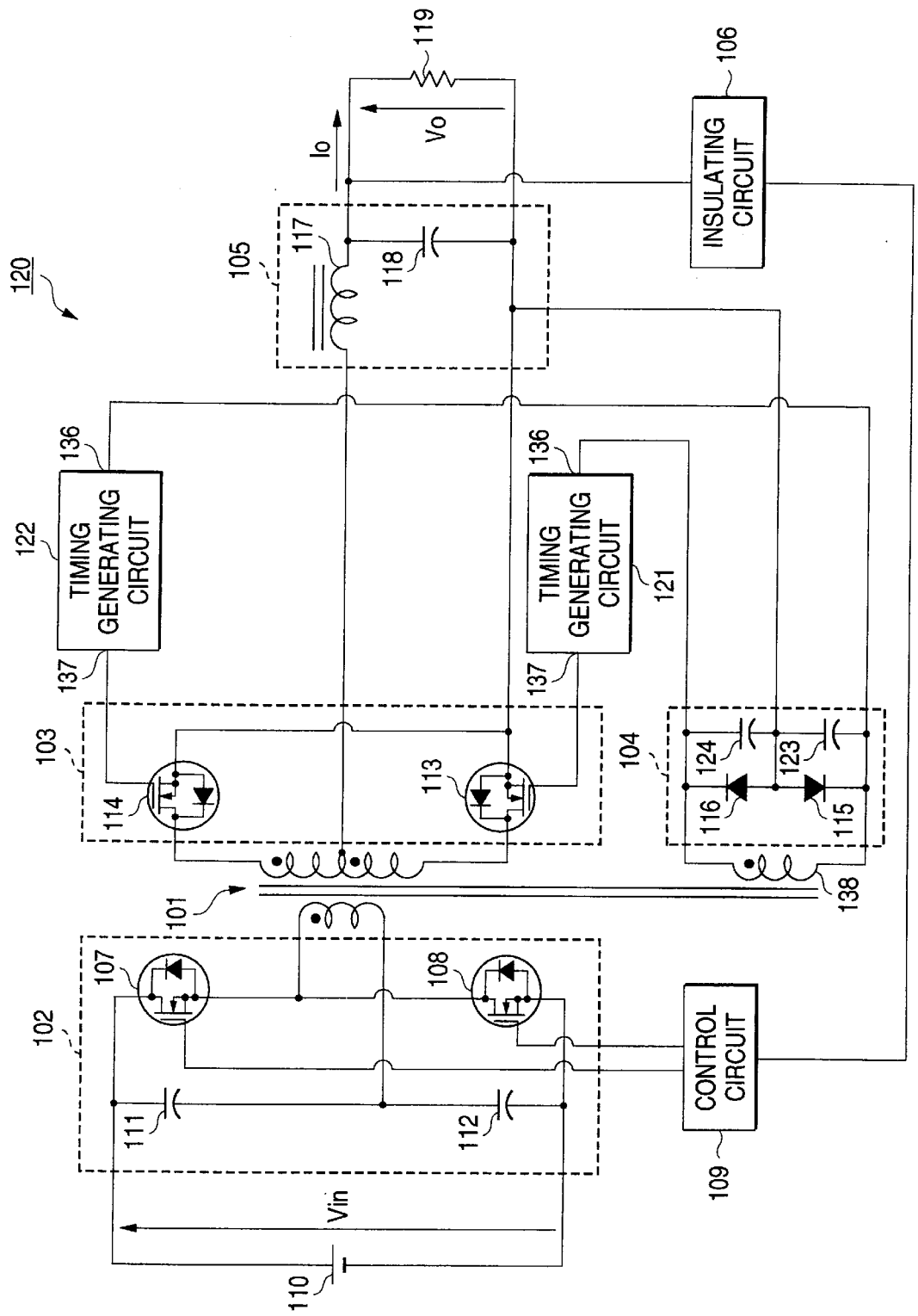
FIG. 1 is a circuit diagram of a switching power supply unit according to the first embodiment of the invention.

FIG. 1 is a circuit diagram of a switching power supply unit 120 as the first embodiment of the invention.

Figure 15:
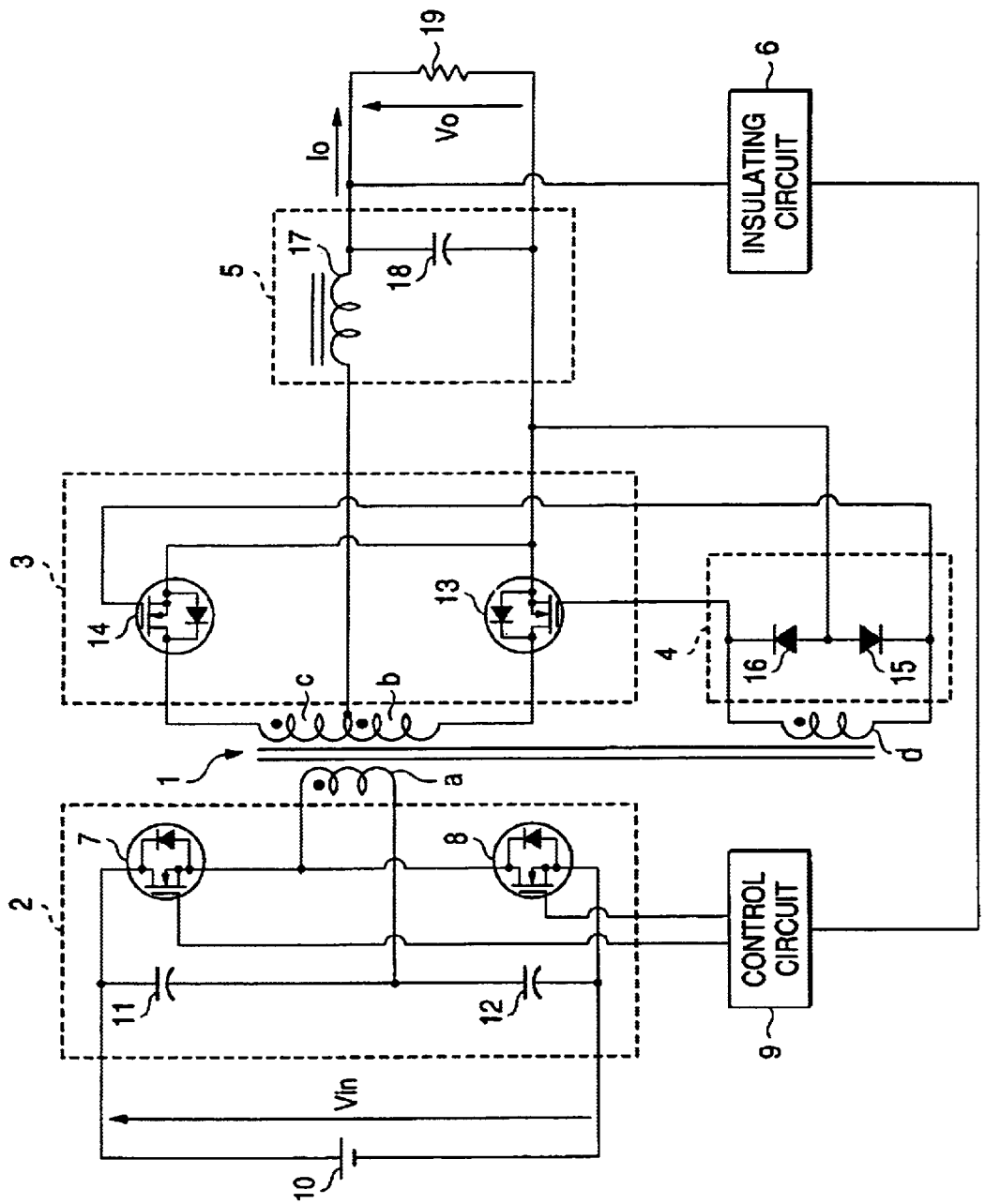
FIG. 15 is a circuit diagram showing a conventional synchronous rectifying switching power supply unit of first related art.
Figure 16:
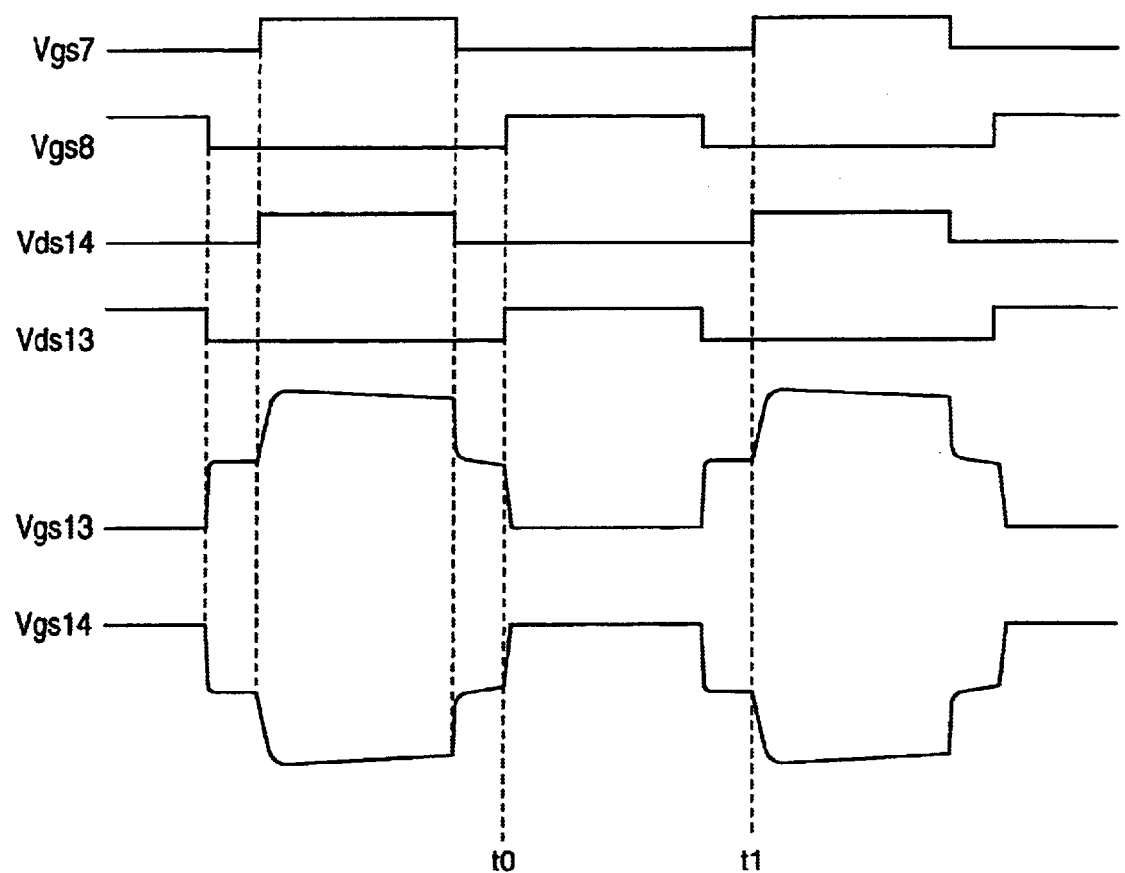
FIG. 16 is a timing chart showing the operation of the conventional synchronous rectifying switching power supply unit of the first related art.
Figure 17:
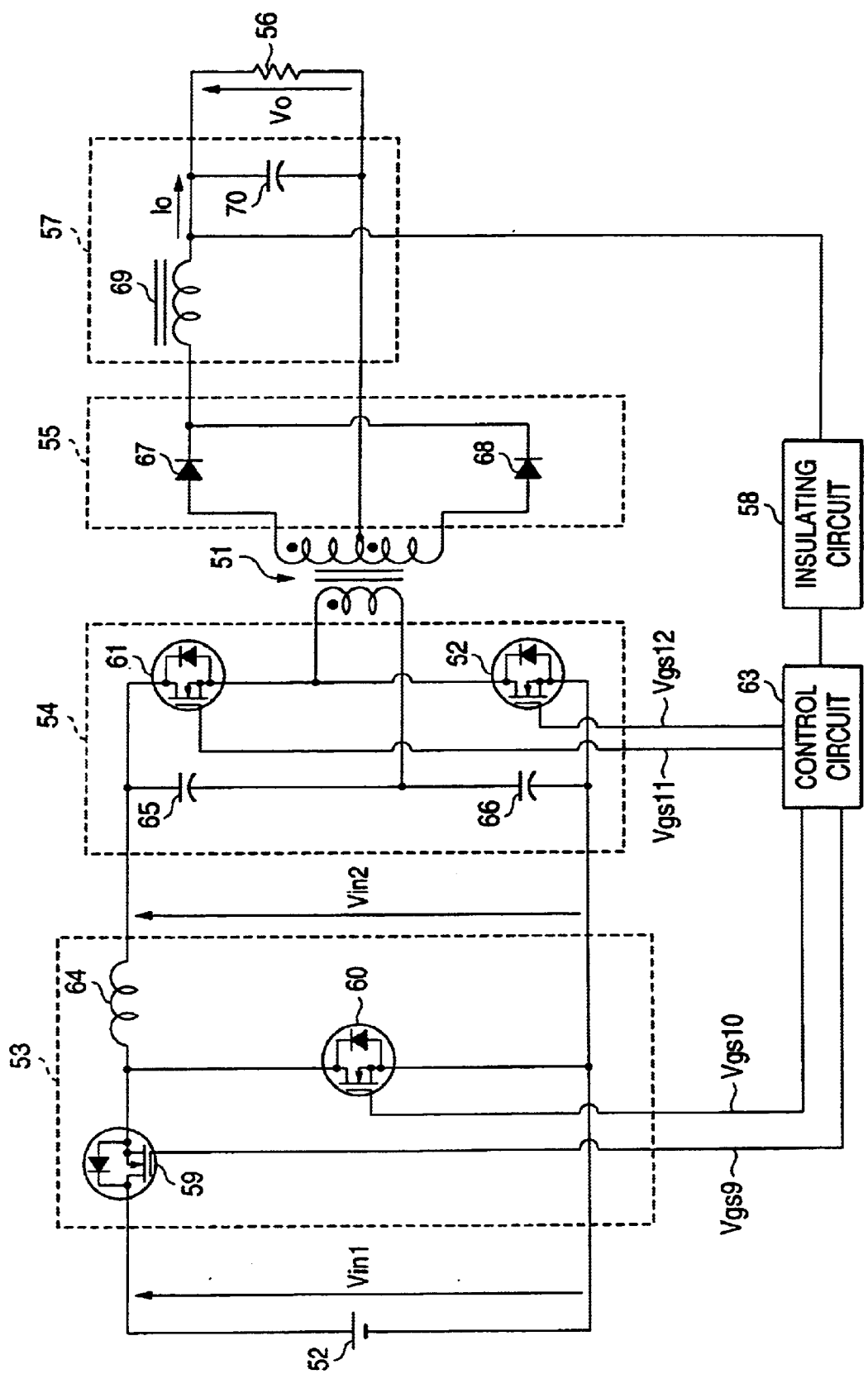
FIG. 17 is a circuit diagram of a conventional switching power supply unit of the third related art.

As shown in FIG. 1, the switching power supply unit 120 according to this embodiment of the invention is a synchronous rectifying switching power supply unit of a so-called half-bridge type like a typical conventional switching power supply unit. However, the switching power supply unit 120 according to this embodiment of the invention is different in that: a first timing generating circuit 121 is inserted in between a rectifier-transistor driving circuit 104 and the gate of a first rectifier transistor 113, and a second timing generating circuit 122 is inserted in between the rectifier-transistor driving circuit 104 and the gate of a second rectifier transistor 114; and that a first auxiliary capacitor 123 is connected between both ends of a first diode 115, and a second auxiliary capacitor 124 is connected between both ends of a second diode 116. As the switching power supply unit according to this embodiment of the invention is similar in construction to the conventional switching power supply unit shown in FIG. 15, the description of the component elements similar to the conventional switching power supply unit will be omitted.

The first and second timing generating circuits 121 and 122 are circuits respectively provided with input terminals 136 connected to the rectifier-transistor driving circuit 104 as well as output terminals 137 connected to the corresponding rectifier transistors 113 and 114, wherein the waveform of the signal supplied to the input terminal 136 is transformed and the signal having the transformed waveform is outputted from the output terminal 137. Further, the first and second auxiliary capacitors 123 and 124 are capacitors for providing capacitance equivalent to the gate-source capacitance of the first and second rectifier transistors 13 and 14 of the switching power supply unit of FIG. 115.

Figure 2:
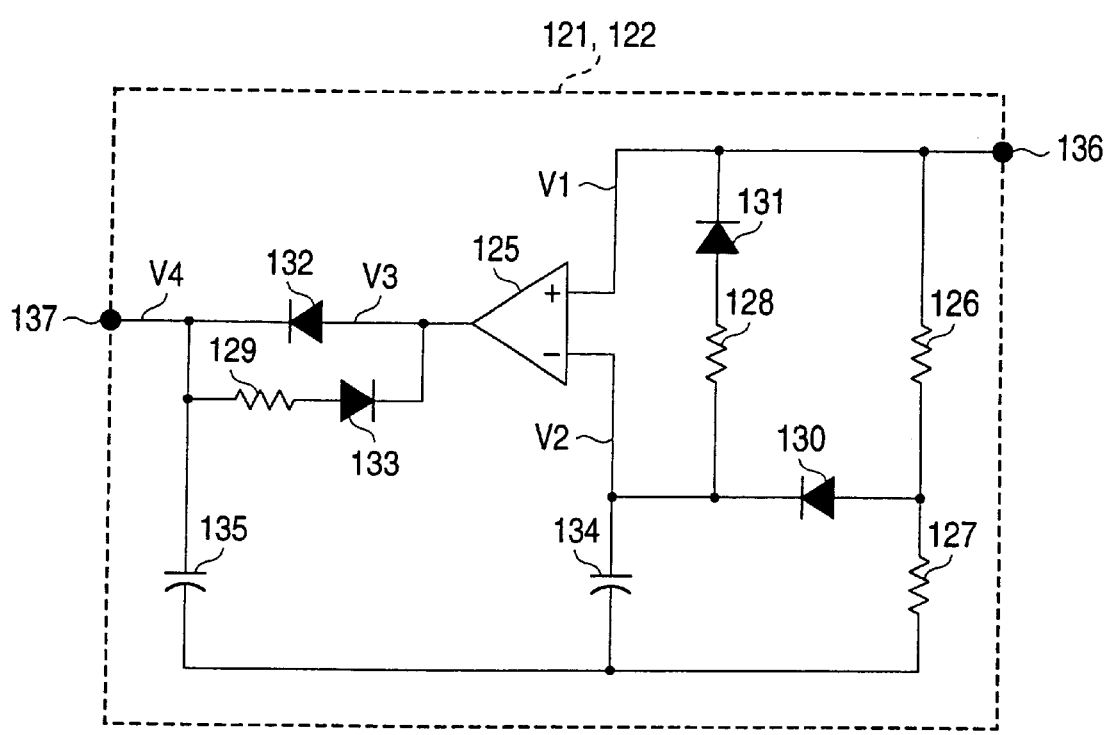
FIG. 2 is a circuit diagram of a first and a second timing generating circuits.

FIG. 2 is a circuit diagram of the first and second timing generating circuits 121 and 122.

As shown in FIG. 2, each of the first and second timing generating circuits has a comparator 125, resistors 126 to 129, diodes 130 to 133 and capacitors 134 and 135. The non-inverted input terminal (+) of the comparator 125 is connected to the input terminal 136, whereas the inverted input terminal (−) thereof is connected via the diode 130 to a node where the resistors 126 and 127 are joined.

The resistors 126 and 127 are used to divide voltage V1 at the input terminal 136 whereby to serve to supply the divided voltage to the inverted input terminal (−) of the comparator 125. The resistor 126, the diode 130 and the capacitor 134 work as a time constant circuit (a first time-constant circuit) when the voltage V1 at the input terminal 136 changes from a low level to a high level. Moreover, the resistor 128, the diode 131 and the capacitor 134 work as a time constant circuit (a second time-constant circuit) when the voltage V1 at the input terminal e changes from the high level to the low level. Thus, voltage V2 at the inverted input terminal (−) of the comparator 125 is divided voltage at the input terminal 136, that is, divided from the voltage V1 at the non-inverted input terminal (+) of the comparator 125 and has a delayed waveform.

The resistor 129, the diode 133 and the capacitor 135 work as a time constant circuit (a third time-constant circuit) when the output voltage V3 of the comparator 125 changes from the high level to the low level. No time constant circuit is provided when the output of the comparator 125 changes from the low level to the high level. Consequently, voltage V4 at the output terminal 137 is such that the rising of its waveform is substantially equal to the rising of the output voltage V3 of the comparator 125 and that the falling of its waveform is slower than the falling of the output voltage V3 thereof.

The operation of the switching power supply unit 120 according to this embodiment of the invention will now be described.

Figure 3:
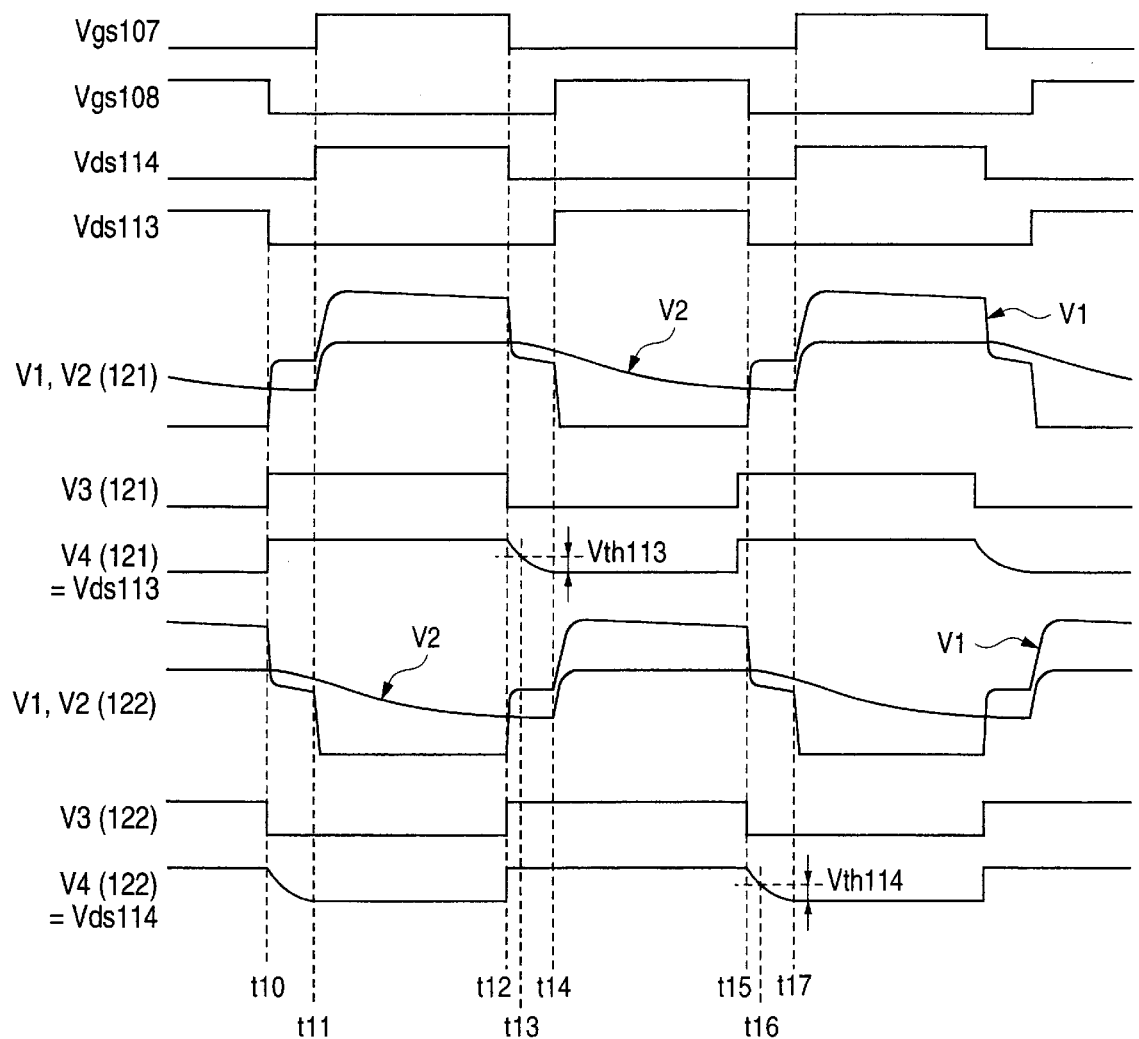
FIG. 3 is a timing chart showing the operation of the switching power supply unit.

FIG. 3 is a timing chart showing the operation of the switching power supply unit 120 according to this embodiment of the invention.

As shown in FIG. 3, in the switching power supply unit 120, a first and a second main switch 107 and 108 are driven alternately under the control of a control circuit 109 at intervals of predetermined dead time and in response to the operation, the secondary voltage is generated across the source and drain of the second rectifier transistor 114 during the interval the first main switch 107 is "on", whereas the secondary voltage is generated across the source and drain of the first rectifier transistor 113 during the interval the second main switch 108 is "on".

In this case, in the rectifier-transistor driving circuit 104, the first diode 115 is turned on during the interval the first main switch 107 is "on" and the second diode 116 is turned on during the interval the second main switch 108 is "on". Consequently, during the interval the first main switch 107 is "on", the gate-source channel of the first rectifier transistor 113 is driven and turned on and during the interval the second main switch 108 is "on", the gate-source channel of the second rectifier transistor 114 is driven and turned on. Further, as the gate of the first rectifier transistor 113 and the gate of the second rectifier transistor 114 are short-circuited via the third secondary winding 138 of a transformer 101 during the interval the first and second main switches 107 and 108 both are "off", the gate-source voltages of the first rectifier transistor 113 and the second rectifier transistor 114 each become intermediate voltages.

As stated above, the voltage V1 supplied to the input terminals 136 of the first and second timing generating circuits 121 and 122 has a waveform that repeats three conditions including the low level, the high level and an intermediate potential as in the case of Vgs13 or Vgs14 in the conventional switching power supply unit.

The operation of the first timing generating circuit 121 will now be described.

As shown in FIG. 3, in such a state that the voltage V1 in the first timing generating circuit 121 remains at the low level (before time t10), V1<V2, whereby the output voltage V3 of the comparator 125 provided in the first timing generating circuit 121 comes to have the low level. Consequently, the voltage V4 at the output terminal 137 also has the low level before the time t10 and the first rectifier transistor 113 is held OFF. In the meantime, the capacitor 134 is gradually discharged via the resistor 128 and the diode 131. In other words, the voltage V2 lowers at the speed determined by the time constant of the second time-constant circuit. In this case, it is necessary for the voltage V2 to remain lower than the intermediate voltage of the voltage V1 until the arrival of the time t10. Therefore, the time constant of the second time-constant circuit is needed to be set so that the relevant conditions are satisfied.

When the voltage V1 rises from the low level to the intermediate potential (time t10), V1>V2, whereby the output voltage V3 of the comparator 125 is inverted and has the high level. When the output voltage V3 of the comparator 125 comes to have the high level, the voltage at the output terminal 137 immediately rises to the high level, whereby the first rectifier transistor 113 is turned on.

Then the voltage V1 rises from the intermediate potential to the high level (time t11) and holds the high level until the timing the first main switch 107 is turned off (time t12). In the meantime, the capacitor 134 is gradually charged via the resistor 126 and the diode 130. In other words, the voltage V2 rises at the speed determined by the time constant of the first time-constant circuit. In this case, it is necessary for the voltage V2 to rise up to a voltage exceeding the intermediary voltage of the voltage V1 until the arrival of the time t12. Therefore, the time constant of the first time-constant circuit is needed to be set so that the relevant conditions are satisfied.

When the voltage V1 falls from the high level to the intermediate potential (time t12), V1<V2 again, whereby the output voltage V3 of the comparator 125 is inverted and has the low level. When the output voltage V3 of the comparator 125 comes to have the low level, the capacitor 135 is gradually discharged via the resistor 129 and the diode 133. In other word, the voltage V4 falls at the speed determined by the time constant of the third time-constant circuit.

With the passage of the predetermined time after the time t12, the voltage V4 at the output terminal 137 falls below the threshold voltage Vth113 of the first rectifier transistor 113 (time t13) and the first rectifier transistor 113 is turned off. In this case, it is necessary for the voltage V4 at the output terminal 137 to be lower than the threshold voltage Vth113 of the first rectifier transistor 113 prior to the timing the second main switch 108 is turned on (time t14), that is, the secondary voltage of the transformer 101 is generated across the source and drain of the first rectifier transistor 113. Therefore, the time constant of the third time-constant circuit is needed to be set so that the relevant conditions are satisfied.

The operation of the second timing generating circuit 122 is similar to that of the first timing generating circuit 121. At the time t12, the voltage V4 at the output terminal 137 of the second timing generating circuit 122 comes to have the high level and after the voltage V1 falls from the high level to the intermediate potential (time t15), the voltage V4 at the output terminal 137 falls below the threshold voltage Vth114 of the second rectifier transistor 114 (t16) prior to the timing the first main switch 101 is turned on (time t17), that is, the secondary voltage of the transformer 101 is generated across the source and drain of the second rectifier transistor 114.

Thus, even in consideration of the operational delay unavoidably caused in the first rectifier transistor 113 and the second rectifier transistor 114, it is ensured that the first rectifier transistor 113 is turned off at the timing (time t14) the secondary voltage is generated across the source and drain of the first rectifier transistor 113 and it is also ensured that the second rectifier transistor 114 is turned off at the timing (time t17) the secondary voltage is generated across the source and drain of the second rectifier transistor 114. Therefore, no through current flows in the first rectifier transistor 113 and the second rectifier transistor 114.

In the switching power supply unit 120 according to this embodiment of the invention, the first and second timing generating circuits 121 and 122 are provided between the rectifier circuit 103 and the rectifier-transistor driving circuit 104. Accordingly, the generation of through current can effectively be prevented by advancing the timing the first and second rectifier transistors 113 and 114 are turned off without substantially varying the timing the first and second rectifier transistors 113 and 114 are turned on. Thus, the conversion efficiency of the whole switching power supply unit is enhanced as power loss is reducible.

It is further understood that the invention is not limited to the preferred embodiment of the invention as set forth above but may be subjected to various changes and modifications without departing from the scope of the invention and needless to say inclusive of these changes and modification as integral part of the claims thereof.

Figure 4:
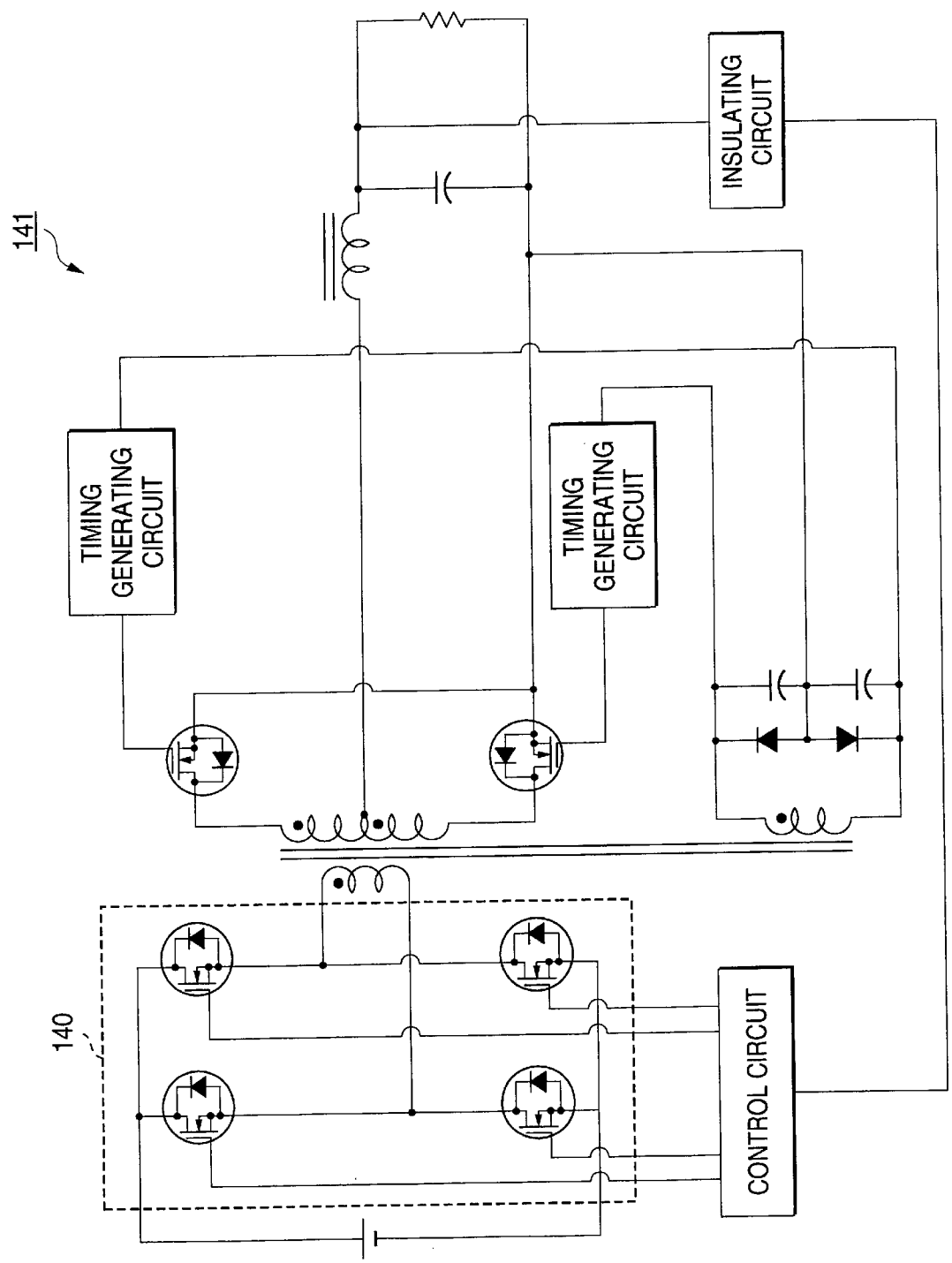
FIG. 4 is a circuit diagram of a switching power supply unit wherein a full-bridge circuit is used as the primary circuit of the transformer by way of example.
Figure 5:
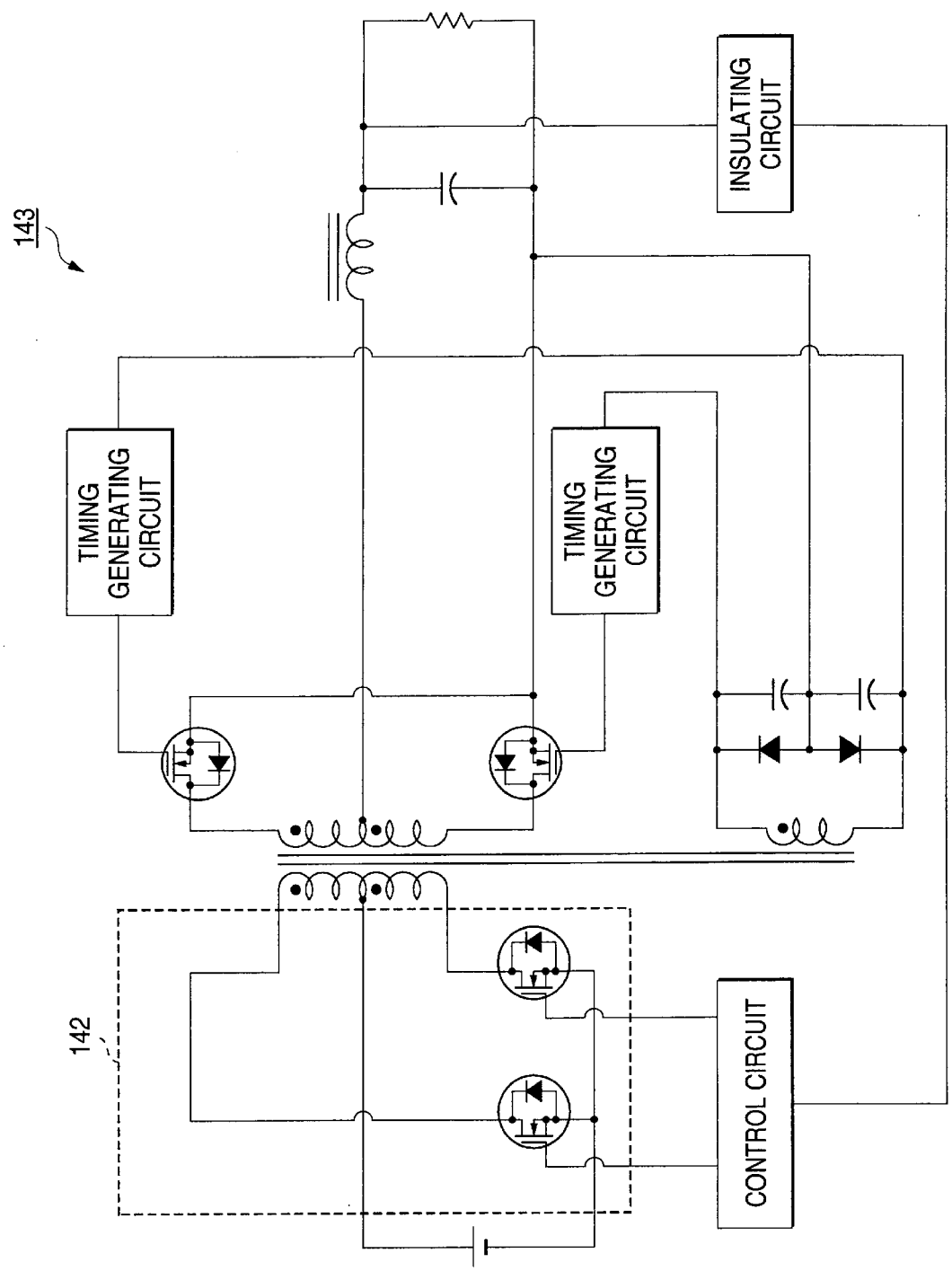
FIG. 5 is a circuit diagram of a switching power supply unit wherein a push-pull circuit is used as the primary circuit of the transformer by way of example.
Figure 6:
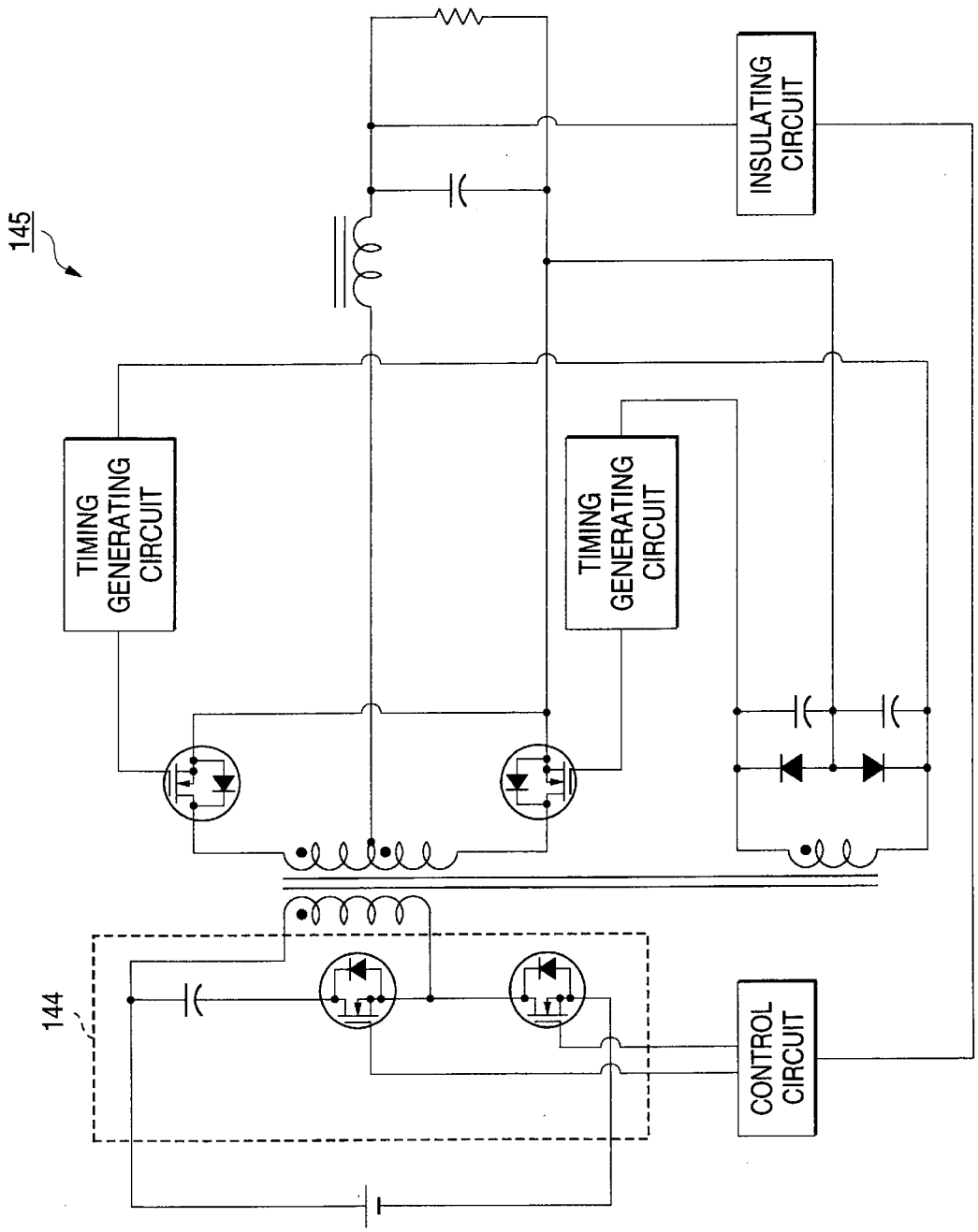
FIG. 6 is a circuit diagram of a switching power supply unit wherein an active clamping circuit is used as the primary circuit of the transformer by way of example.

For example, in the switching power supply unit 120 according to this embodiment of the invention, though the half-bridge circuit 102 has been employed as the primary circuit of the transformer 101, the primary circuit of the transformer 101 is not limited to such a half-bridge circuit but may be any other circuit. FIGS. 4 to 6 show examples of those other than the half-bridge circuit.

FIG. 4 is a circuit diagram of a switching power supply unit 141 wherein a full-bridge circuit 140 is used as the primary circuit of the transformer 101 by way of example. As shown in FIG. 4, it is applicable to the invention to use the full-bridge circuit 140 as the primary circuit of the transformer 101.

FIG. 5 is a circuit diagram of a switching power supply unit 143 wherein a push-pull circuit 142 is used as the primary circuit of the transformer 101 by way of example. As shown in FIG. 5, it is applicable to the invention to use the push-pull circuit 142 as the primary circuit of the transformer 101.

FIG. 6 is a circuit diagram of a switching power supply unit 145 wherein an active clamping circuit 144 is used as the primary circuit of the transformer 101 by way of example. As shown in FIG. 6, it is applicable to the invention to use the active clamping circuit 144 as the primary circuit of the transformer 101.

Figure 7:
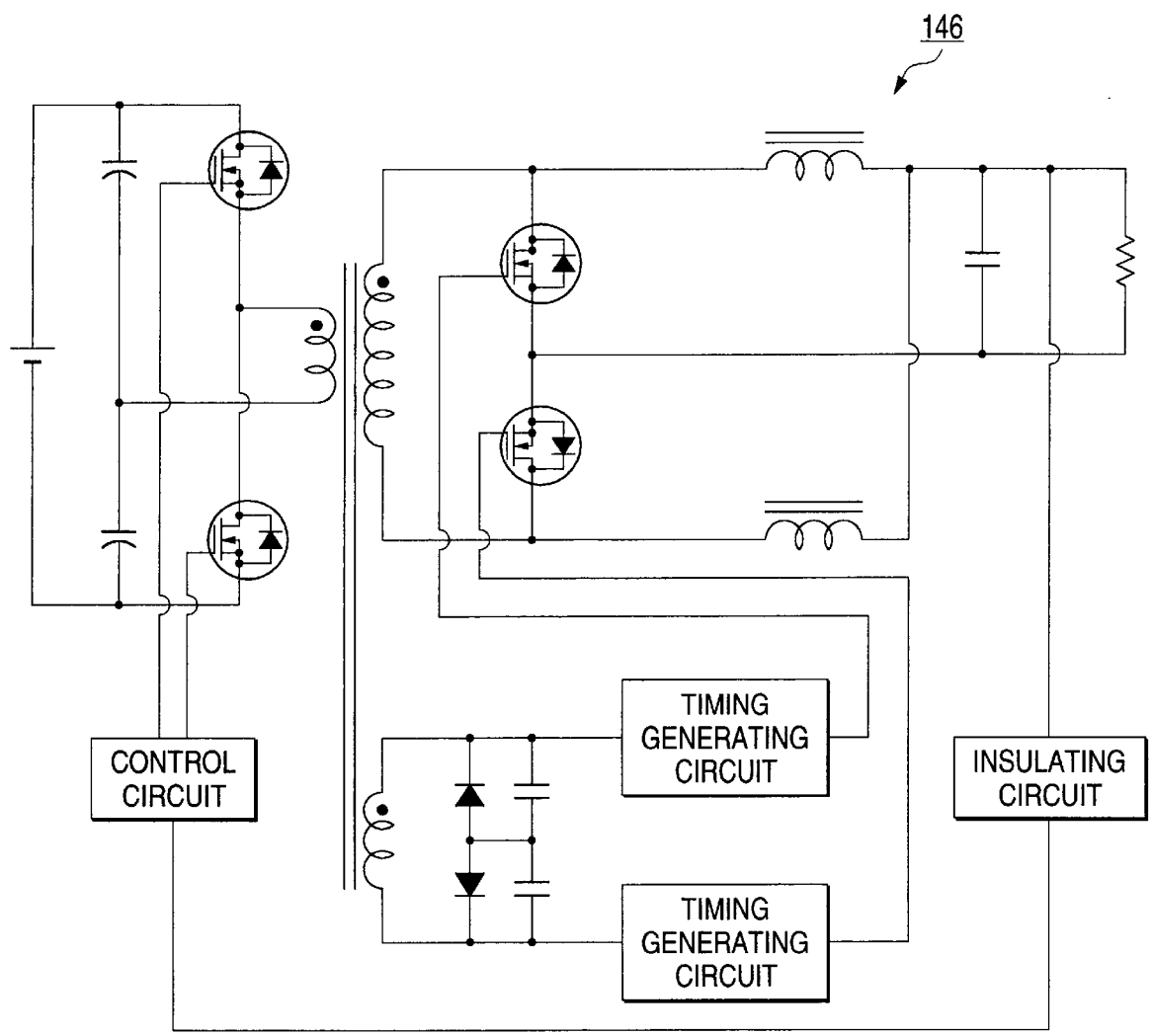
FIG. 7 is a circuit diagram of a switching power supply unit wherein other circuits are used as the secondary circuit of the transformer.

With regard to the secondary circuit of the transformer 101, though the rectifier circuit 103 and the smoothing circuit 105 have been employed in the switching power supply unit according to this embodiment of the invention, other circuits may be used and FIG. 7 shows an example in this case. In other words, it is applicable to the invention to use the circuit shown in FIG. 7 as the secondary circuit of the transformer 101.

The specific circuit configuration of the first and second timing generating circuits 121 and 122 according to the above embodiment of the invention is the one shown by way of example and as long as the on/off timing of the first and second rectifier transistors 113 and 114 is controllable in the same manner as in the above embodiment of the invention, any timing generating circuit different in configuration may be used. With regard to the third time-constant circuit including the capacitor 135, the resistor 129 and the diode 133 provided in each of the first and second timing generating circuits 121 and 122, for example, the capacitor 135 may be deleted by utilizing the capacitance across the gate and source of each of the first and second rectifier transistors 113 and 114.

A buffer circuit may be inserted in between the gate of each of the first and second rectifier transistors 113 and 114 and the output terminal 137 of each of the first and second timing generating circuits 121 and 122. In this case, by setting the threshold voltages of these buffer circuits substantially equal to the threshold voltages Vth113 and Vth114 of the respective first and second timing generating circuits 121 and 122, the gate-source voltage of the first rectifier transistor 113 can be set at about 0V at the time t13 and the gate-source voltage of the first rectifier transistor 113 can also be set at about 0V at the time t16.

(Embodiment 2)

The second embodiment of the invention will now be described in detail with reference to the drawings, wherein like reference characters are given to like members in the drawings and the repeated description thereof is omitted. This embodiment of the invention is a mode specifically useful for implementing the invention and the invention is not limited to the embodiment described herein.

Figure 8:
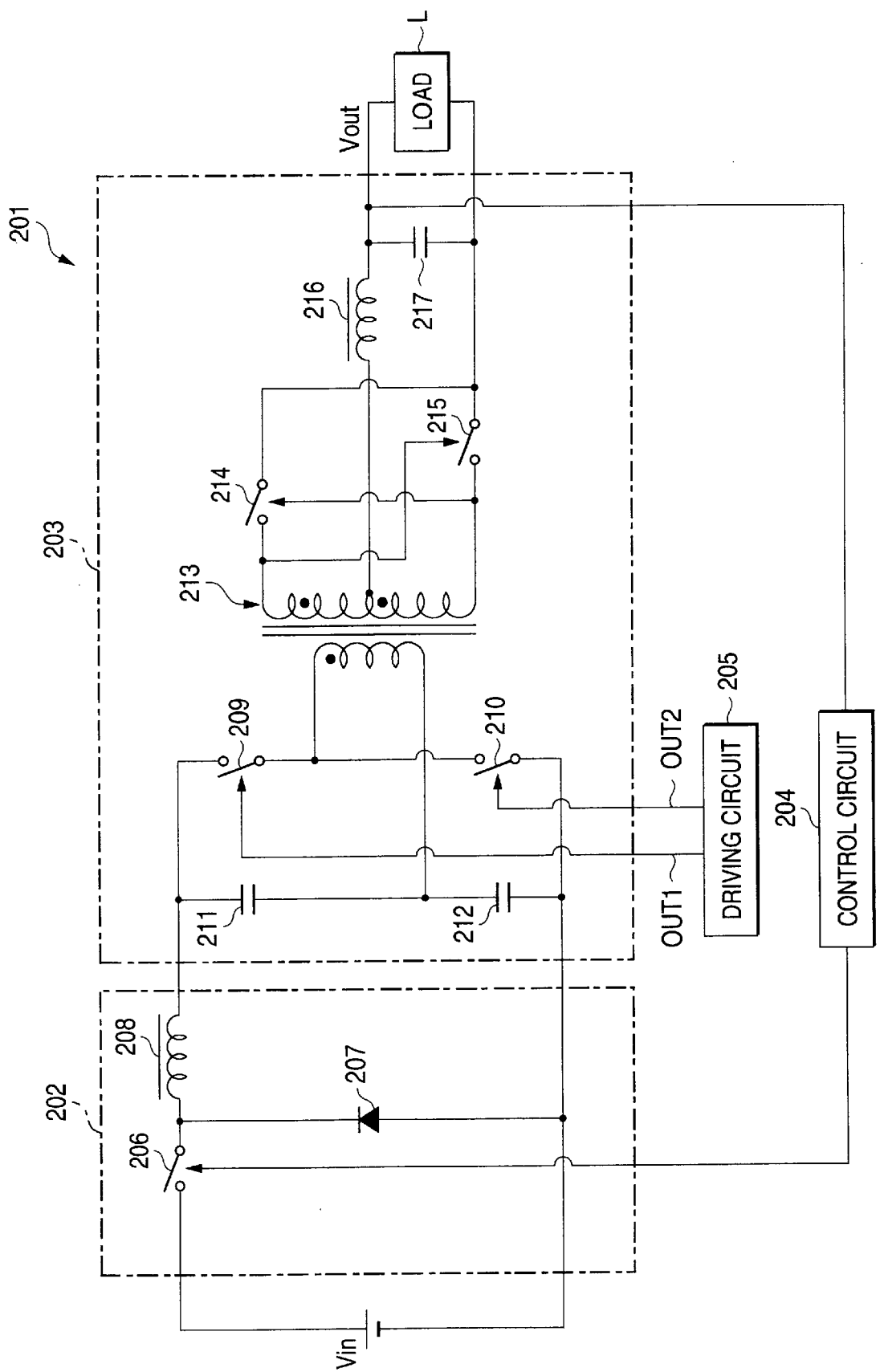
FIG. 8 is a circuit diagram of a switching power supply unit according to the second embodiment of the invention.
Figure 9:
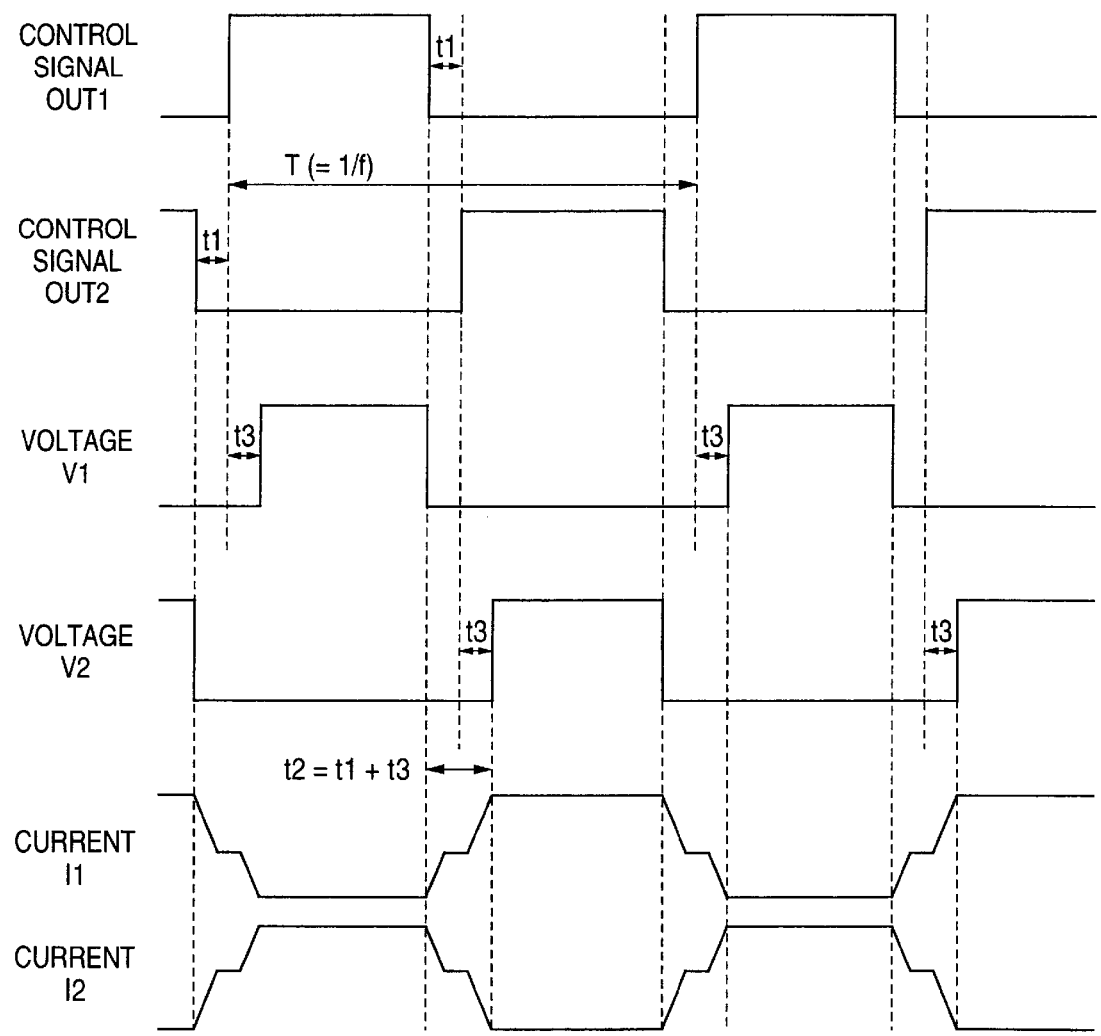
FIG. 9 is a timing chart showing the voltage/current waveform of each portion in the switching power supply unit of FIG. 8 when the sum of a dead time period and leakage from a transformer is equal to switching delay time of a synchronous rectifying element.
Figure 10:
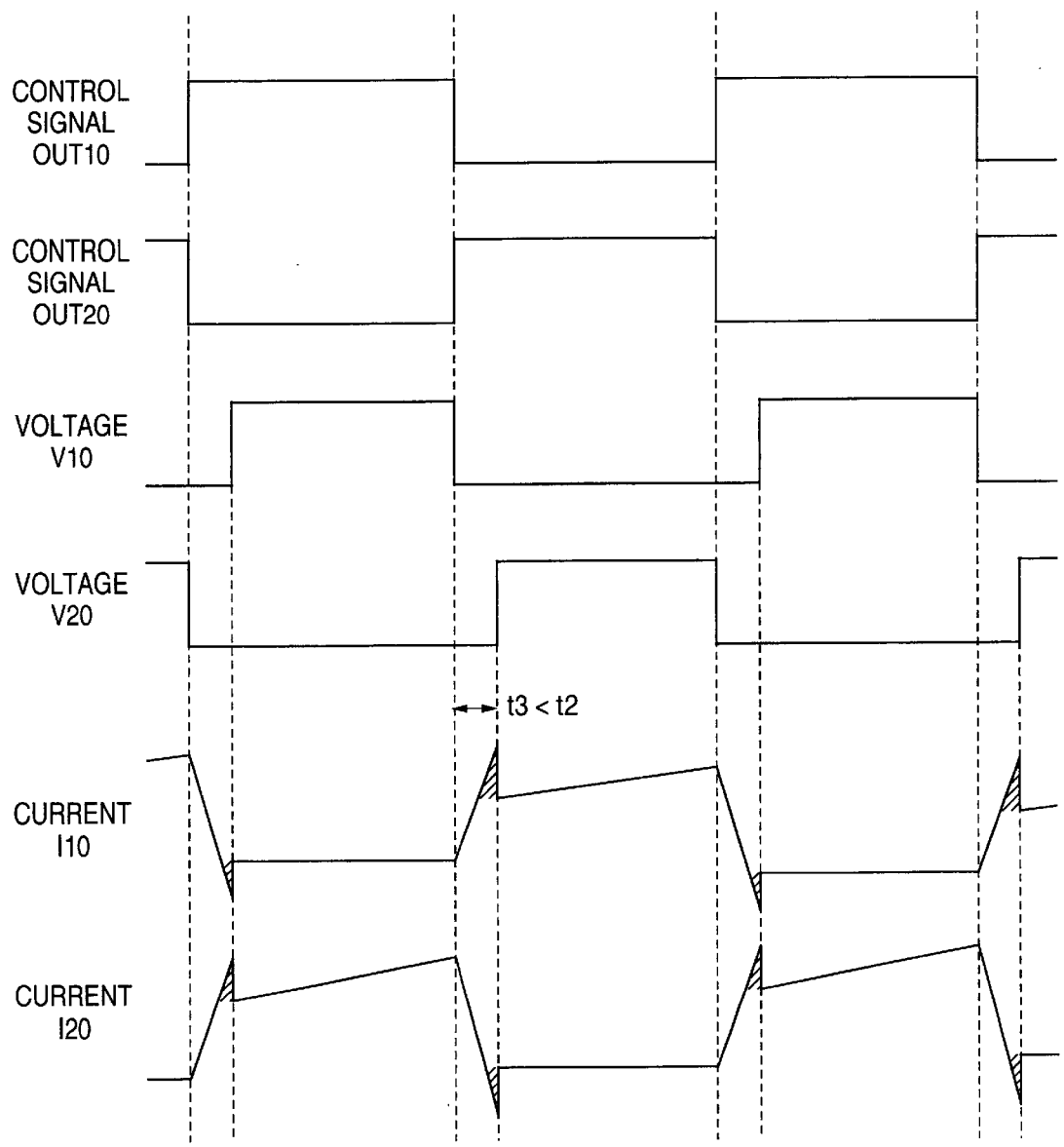
FIG. 10 is a timing chart showing the voltage/current waveform of each portion when the commutation period of leakage from the transformer is shorter than switching delay time of the synchronous rectifying element in the switching power supply unit studied by the present inventor.
Figure 11:
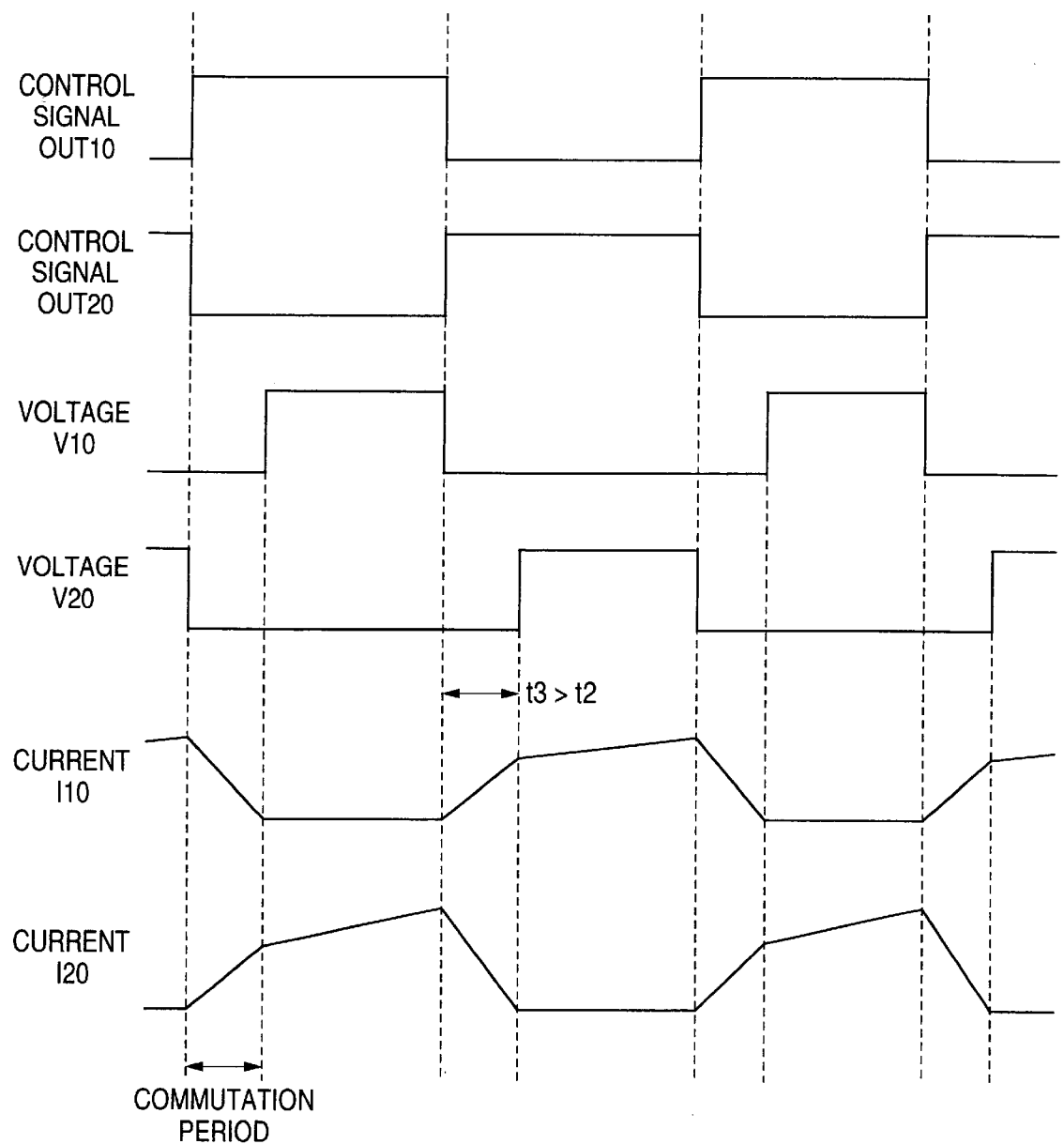
FIG. 11 is a timing chart showing the voltage/current waveform of each portion when the commutation period of leakage from the transformer is longer than switching delay time of the synchronous rectifying element in the switching power supply unit studied by the present inventor.

FIG. 8 is a circuit diagram of a switching power supply unit; FIG. 9 is a timing chart showing the voltage/current waveform of each portion in the switching power supply unit of FIG. 8 when the sum of a dead time period and commutation period of a transformer leakage is equal to switching delay time of a synchronous rectifying element; FIG. 10 is a timing chart showing the voltage/current waveform of each portion when the commutation period of the transformer leakage is shorter than switching delay time of the synchronous rectifying element in the switching power supply unit studied by the present inventor; and FIG. 11 is a timing chart showing the voltage/current waveform of each portion when the commutation period of the transformer leakage is longer than switching delay time of the synchronous rectifying element in the switching power supply unit studied by the present inventor.

According to this embodiment of the invention, a switching power supply unit 201 includes a step-down converter (buck converter) 202, a half-bridge converter (converter) 203, a control circuit 204, and a driving circuit 205.

The step-down converter 202 is used for stepping down input voltage Vin to a certain voltage level and outputting the stepped-down voltage. The step-down converter 202 includes a switching element 206, a diode 207, and an inductor 208.

The half-bridge converter 203 is used for converting the voltage generated by the step-down converter 202 to AC voltage once, insulating and subjecting the AC voltage to voltage conversion, outputting DC output voltage Vout having a rectified voltage level and supplying the DC output voltage to a load L.

Further, the half-bridge converter 203 includes switching elements 209 and 210, capacitors 211, 212 and 217, a transformer 213, synchronous rectifying switch elements 214 and 215, and an inductor 216.

The switching elements 206, 209 and 210 and the synchronous rectifying switch elements 214 and 215 are formed of, for example, transistors such as MOS-FETs. The ON/OFF operation of the switching element 206 is controlled by the control circuit 204 and the ON/OFF operation of the switching elements 209 and 210 are controlled by the driving circuit 205.

One joint of the switching element 206 is arranged so that input voltage Vin is inputted thereto, whereas the other joint of the switching element 206 is arranged so that the cathode of the diode 207 and one joint of the inductor 208 are connected thereto.

One joint of a capacitor 211 and one joint of the switching element (first switching element) 209 are connected to the other joint of the inductor 208.

One input portion on the primary winding side of the transformer 213 and one joint of the switching element (second switching element) 210 are connected to the other joint of the switching element 209.

The other input portion on the primary winding side of the transformer 213 and one joint of a capacitor (second capacitor) 212 are connected to the other joint of the capacitor (first capacitor) 211. Further, a reference potential (GND) is connected to the anode of the diode 207, the other joint of the switching element 210 and the other joint of the capacitor 212.

A connection is provided so that a control signal from the control circuit 204 is supplied to the control terminal (gate) of the switching element 206 and a connection is also provided so that a control signal (first control signal) OUT1 from the driving circuit 205 and a control signal (second control signal) OUT2 are supplied to the control terminals (gates) of the switching elements 209 and 210, respectively.

One joint of the synchronous rectifying switch element (first synchronous rectifying switch element) 214 and the control terminal (gate) of the synchronous rectifying switch element (second synchronous rectifying switch element) 215 are connected to one output portion on the secondary winding side of the transformer 213.

One joint of the inductor 216 is connected to one output portion (center tap) on the secondary winding side of the transformer 213. One joint of the synchronous rectifying switch element 215 and the control terminal (gate) of the synchronous rectifying switch element 214 are connected to the other output portion on the secondary winding side of the transformer 213. The other joint of the synchronous rectifying switch element 215 is connected to the other joint of the synchronous rectifying switch element 214.

In the half-bridge converter 203, a half-bridge circuit is formed with the switching elements 209 and 210 and the capacitors 211 and 212, and a center-tap type output rectifying circuit is formed with the synchronous rectifying switch elements 214 and 215, the inductor 216 and the capacitor 217.

Moreover, the synchronous rectifying switch elements 214 and 215 form a self-drive type synchronous rectifier circuit for performing synchronous rectification by use of the voltage generated on the secondary winding side of the transformer 213.

One joint of the capacitor 217 is connected to the other joint of the inductor 216, whereas the other joint of the synchronous rectifying switch element 215 is connected to the other joint of the capacitor 217.

The other joint of the inductor 216 and the other joint of the capacitor 217 constitute the output portion of the switching power supply unit 201 and the output voltage Vout for being supplied to the load L is sent out of the output portion thereof.

The control circuit 204 detects the output voltage Vout from the half-bridge converter 203 and optimizes the output voltage Vout under its control by making variable the duty ratio of the control signal applied to the switching element 206 of the step-down converter according to the detected results.

The driving circuit 205 supplies the control signals OUT1 and OUT2 to the control terminals of the respective switching elements 209 and 210 provided in the half-bridge converter 203 whereby to control the ON/OFF operation of the switching elements 209 and 210. The duties of the control signals OUT1 and OUT2 sent out of the driving circuit 205 are fixed, so that the switching elements 209 and 210 are each driven to have dead time.

The operation of the driving circuit 205 provided in the switching power supply unit 201 according to this embodiment of the invention will now be described with reference to FIG. 8 and a signal timing chart of FIG. 9.

In FIG. 9, there are shown from top to bottom waveform timing of the control signal OUT1 sent out of the driving circuit 205, the control signal OUT2 sent out of the driving circuit 205, the voltage V1 across both joints of the synchronous rectifying switch element 214, the voltage V2 across both joints of the synchronous rectifying switch element 215, current I1 flowing into the synchronous rectifying switch element 214, and current I2 flowing into the synchronous rectifying switch element 215.

When the control signal OUT1 is sent out of the driving circuit 205, as the switching element 209 is turned on, the voltage V1 on the secondary winding side of the transformer 213 comes to have the HI level and the synchronous rectifying switch element 215 is also turned on whereby to make the current I2 flow.

In this case, the driving circuit 205 is preset so that the control signals OUT1 and OUT2 containing dead time of t1 shown in FIG. 9 are sent out. The control signals OUT1 and OUT2 including the dead time may be generated by hardware or software.

In FIG. 9, moreover, time t2 corresponds to delay time in the operation of the synchronous rectifying switch elements 214 and 215 and time t3 indicates a commutation period due to leakage from the transformer 213. FIG. 9 refers to an example in which the delay time t2 in the operation of the synchronous rectifying switch element is equal to the sum of the dead time t1 and the commutation period t3.

The dead time of the control signals OUT1 and OUT2 is set so that the sum of the dead time and the commutation period (time t1+time t3) is substantially equal to the delay time (time t2) in the operation of the synchronous rectifying switch element or slightly longer than the delay time t2 in the operation of the synchronous rectifying switch element.

The most efficient value of the dead time for the generation of the switching power supply is given when the sum of the dead time and the commutation period (time t1+time t3) is equal to the delay time (time t2) in the operation of the synchronous rectifying switch element and the lower limit value of the dead time is given at this time.

The upper limit value and the lower limit value are defined by the following equations.

Condition 1 (lower limit value): $t2 \leq t1+t3$

Condition 2 (upper limit value): $t1 \times 2 < T - t3 \times 2$

Hence, the upper limit value and the lower limit value of the dead time are obtained from the conditions 1 and 2 as follows:

$$t2-t3 \leq t1 < T/2 - t3$$

In this case, T (=1/f) is assumed to be a switching interval (the interval of the control signal OUT1).

Further, a case where control signals OUT10 and OUT20 of the driving circuit studied by the prevent inventor have no dead time will be described by use of FIGS. 10 and 11.

In FIGS. 10 and 11, there are shown from top to bottom waveform timing of the control signal OUT10 sent out of the driving circuit 205 provided in the switching power supply unit, the control signal OUT20 sent out of the driving circuit 205, voltage V10 across both joints of the synchronous rectifying switch element 214, the voltage V20 across both joints of the synchronous rectifying switch element 215, current I10 flowing into the synchronous rectifying switch element 214, and current I20 flowing into the synchronous rectifying switch element 215.

In case where no dead time exists in the control signals OUT10 and OUT20 sent out of the driving circuit 205, the synchronous rectifying switch elements are simultaneously turned on when delay time in the operation of the synchronous rectifying switch element is longer than the commutation period due to leakage from the transformer as shown in FIG. 10. Then through current (hatching portions of the currents I10 and I20) flows and this may result in not only increasing loss but also damaging the synchronous rectifying switch elements when the worst comes to the worst.

In this case, in order to prevent the through current from flowing into the synchronous rectifying switch element, the transformer is coarsely coupled so as to increase the commutation period due to the leakage as shown in FIG. 11. However, when the commutation period is prolonged, loss increases as the interval the current flows into the body diode of the synchronous rectifying switch element increases and moreover loss due to the leakage from the transformer also increases.

On the other hand, as it is possible to surely prevent the synchronous rectifying switch elements 214 and 215 from being damaged as well as decreasing the commutation period of the transformer 213, that is, reducing or optimizing leakage inductance in the driving circuit 205 for generating the control signals OUT1 and OUT2 having dead time according to this embodiment of the invention, power can be supplied to the switching power supply unit 201 with efficiency by use of the self-drive type rectifying circuit.

Thus, reliable, low-cost and low-loss switching power supply unit 201 can be supplied by providing dead time for the switching elements 209 and 210 according to this embodiment of the invention.

Figure 12:
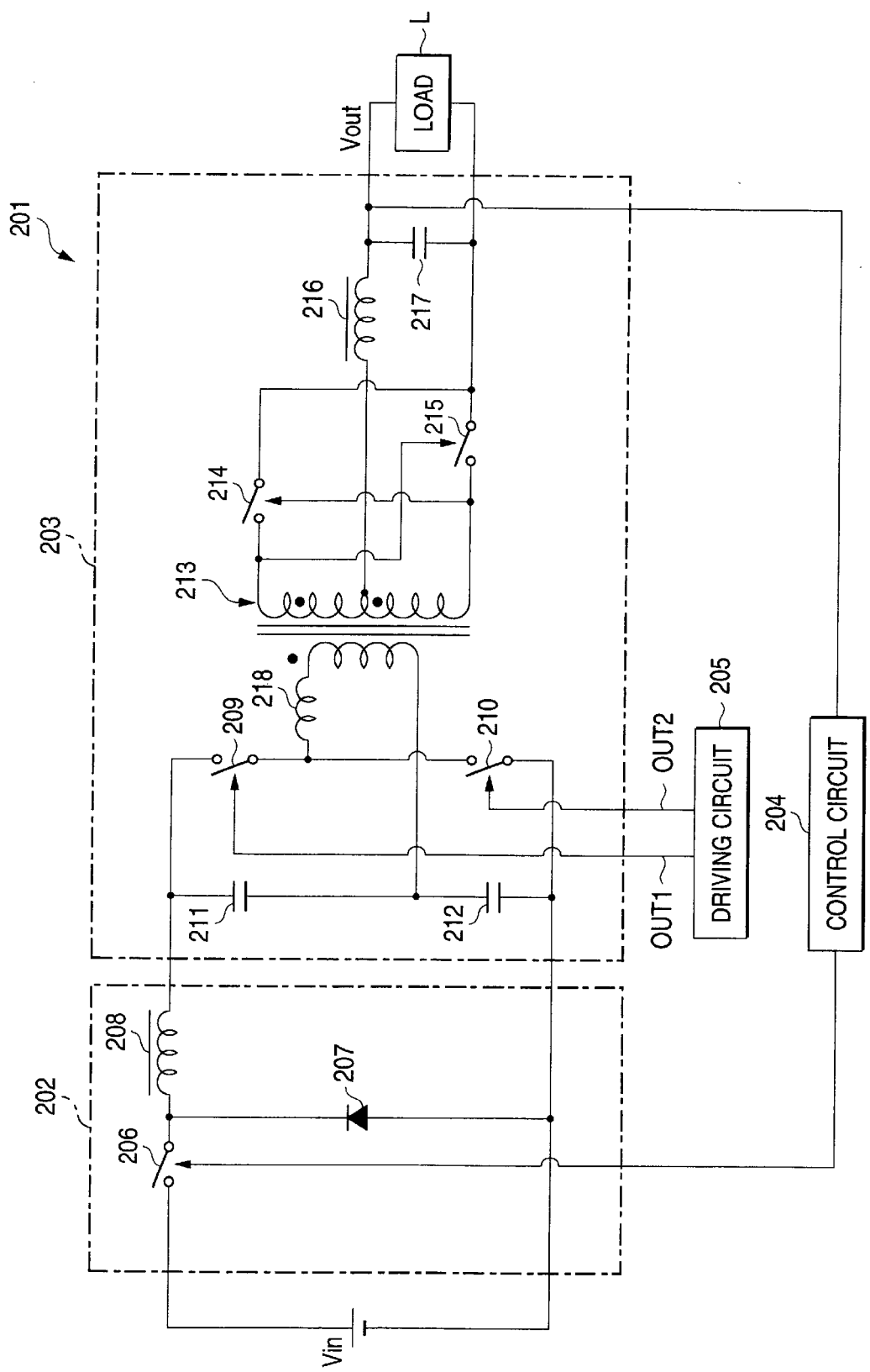
FIG. 12 is a circuit diagram of a switching power supply unit according to another example in the second embodiment of the invention.

According to this embodiment of the invention, moreover, though a description has been given of the switching power supply unit 201 adapted for hard switching with respect to the switching elements 209 and 210, the switching elements 209 and 210 may be arranged so as to carry out soft switching by connecting an inductor 218 between the other joint of the switching element 209 and one input portion of the transformer 213 and utilizing dead time as shown in FIG. 12, for example.

It is thus possible to materialize low-loss highly-reliable switching power supply unit.

Although the step-down converter is provided at the preceding stage according to this embodiment of the invention, a converter to be provided at the preceding stage may be any converter other than the step-down converter such as a boost converter and any other converter.

With regard to the following-state converter, any converter other than the half-bridge converter may be employed; for example, various converters such as a push-pull or a full-bridge converter are applicable to the invention.

With regard to the output rectifier circuit, the invention is not limited to the use of a center tap type but may employ a current doubler type.

(Embodiment 3)

A detailed description will now be given of the third embodiment of the invention by reference to the accompanying drawings.

Figure 13:
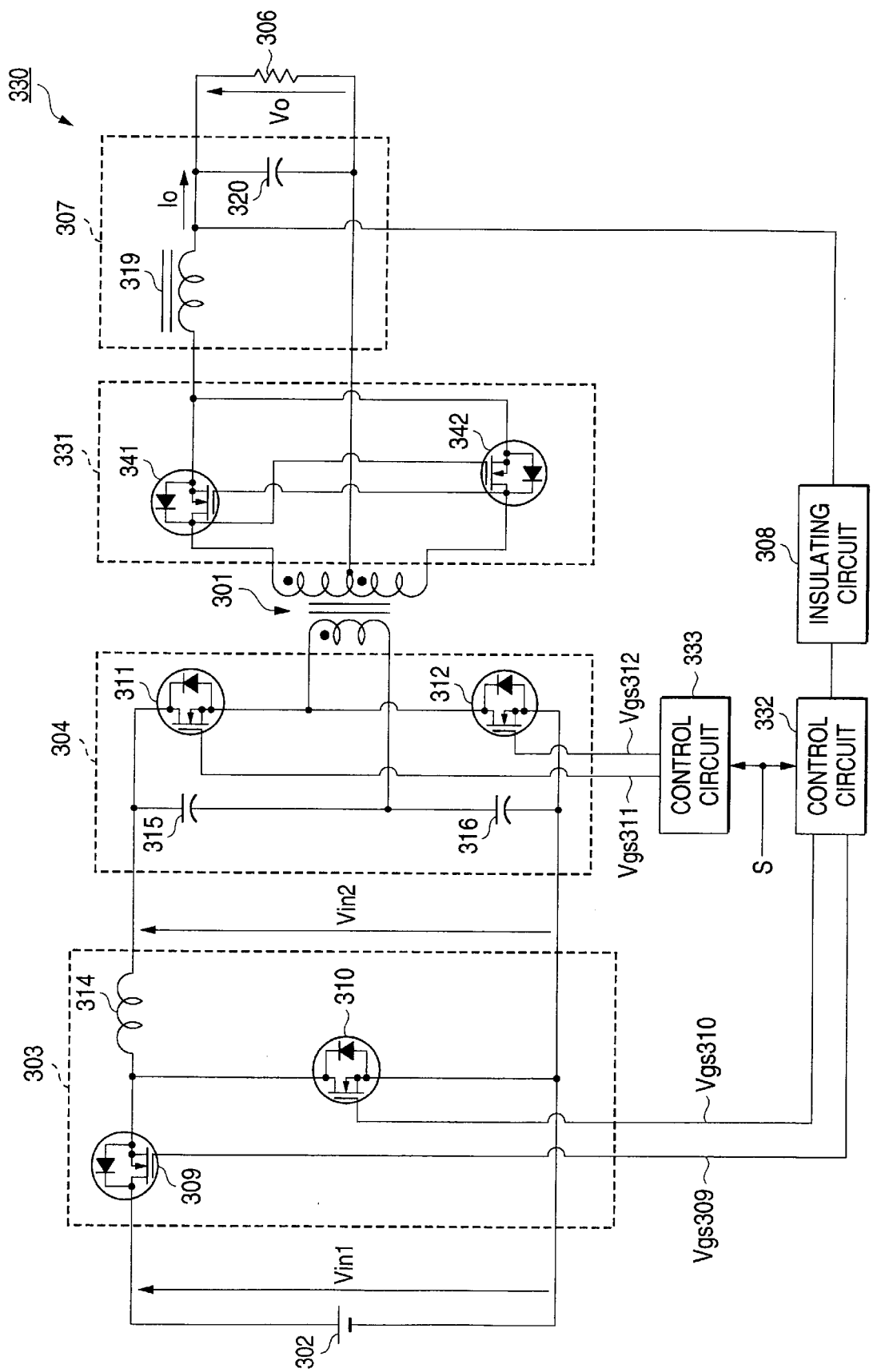
FIG. 13 is a circuit diagram of a switching power supply unit according to the third embodiment of the invention.

FIG. 13 is a circuit diagram of a switching power supply unit 330 according to the third embodiment of the invention.

As shown in FIG. 13, a switching power supply unit 330 according to this embodiment of the invention is what employs a primary circuit including a buck converter circuit and a half-bridge circuit that are connected in series like a conventional switching power supply unit. The switching power supply unit 330 is different from the conventional (third related art) switching power supply unit in that the rectifier circuit 55 provided in the conventional switching power supply unit is replaced with a rectifier circuit 331 and that control circuits 332 and 333 are provided in place of the control circuit 63 provided in the conventional switching power supply unit. As to the rest, because the switching power supply unit according to the invention is similar in configuration to the conventional switching power supply unit, and the similar description thereof will be omitted.

The rectifier circuit 331 includes a first and a second rectifier transistor 341 and 342 and the gate of one of the rectifier transistors 341 and 342 is connected between the other rectifier transistor and the secondary winding of a transformer 301. Consequently, on/off of the first and second rectifier transistors 341 and 341 is automatically controlled by the voltage generated in the secondary winding of the transformer 301; that is, the rectifier circuit 331 is a self-drive type synchronous rectifier circuit.

The control circuit 332 receives a control signal S given by the user in addition to output voltage Vo supplied via an insulating circuit 308 and forms control pulses Vgs309 and Vgs310 to be supplied to the gate electrodes of a first and a second main switch 309 and 310 provided in a buck converter circuit 303 so that the output voltage Vo has a voltage value shown by the control signal S. In this case, though the control signal S may be a signal capable of choosing two kinds of output voltage Vo, 1-bit digital signal is used as the control signal S according to this embodiment of the invention. When the control signal S has a high level, the output voltage Vo (Vo1) should be 3.3V and when the control signal S has a low level, the output voltage Vo (Vo2) should be 1.5V. However, the invention is not limited to this arrangement and, for example, three kinds of output voltage Vo may be selected when a digital signal of 302 bits or greater is employed as the control signal S. Further, an analog signal may be used as the control signal S whereby to show output voltage Vo to be generated linearly according to its voltage value (or current value).

Moreover, control of the control pulses Vgs309 and Vgs310 by the control circuit 332 is so-called duty control and the buck converter circuit 303 is controlled by adjusting the conducting period of the control pulses in such a condition that the frequencies are fixed.

On receiving the control signal S, the control circuit 333 generates control pulses Vgs311 and Vgs312 to be supplied to the gate electrodes of a third and a fourth main switch 311 and 312 provided in the half-bridge circuit 304 according to the control signal S. More specifically, the half-bridge circuit 304 is controlled by adjusting the frequencies according the voltage value indicated by the control signal S in such a condition that dead time DT is fixed.

Figure 14A:
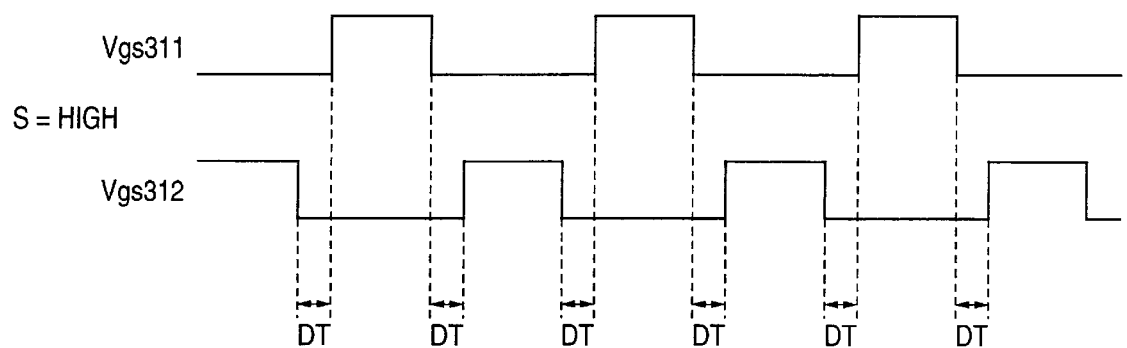
FIGS. 14A and 14B are timing charts illustrating the operation of a control circuit.
Figure 14B:
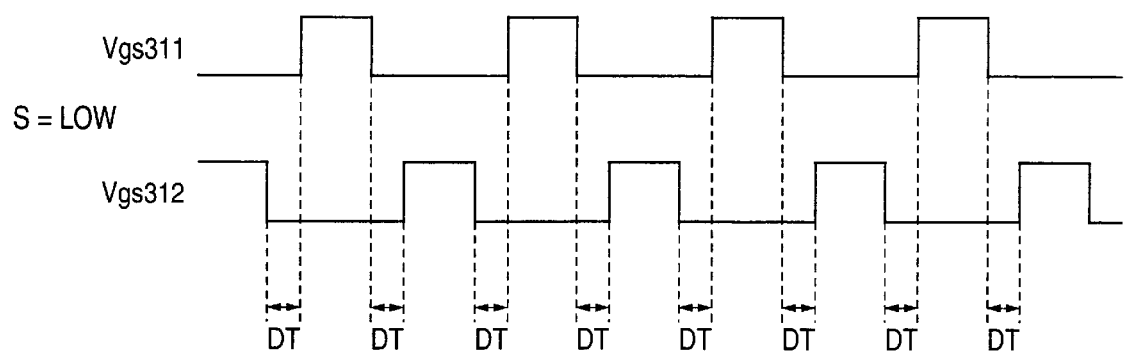

FIGS. 14A and 14B are timing charts illustrating the operation of the control circuit 333.

As shown in FIGS. 14A and 14B, the frequencies of the control pulses Vgs311 and Vgs312 are set to f1 when the control signal S has the high level and the frequencies of the control pulses Vgs311 and Vgs312 are set to f2 (<f1) when the control signal S has the low level. When the control signal S has either level, however, the period during which either of the control pulses Vgs311 and Vgs312 stay at the low level, that is, the dead time DT is so controlled as to be constant. Accordingly, as the duty while the control signal S remains at the low level comes to be lower than the duty while the control signal S remains at the high level, a step-down level is made larger by the half-bridge circuit 304 when the control signal S has the low level.

In this case, how the frequency f1 is set when the control signal S has the high level and how the frequency f2 is set when the control signal S has the low level are determined by output voltage Vo1 to be generated when the control signal S has the high level, output voltage Vo2 to be generated when the control signal S has the low level and the fixed dead time DT. It is preferable to determine that the Vo1 to Vo2 ratio of the output voltage coincides with the ratio of the duty when the control signal S has the high level to the duty when the control signal S has the low level. By setting the frequencies f1 and f2 like this, the step-down level by the buck converter circuit 303 can be made substantially constant when the control signal S has either level.

Further, the dead time DT is preferably determined according to delay time in the operation of the first and second rectifier transistors 341 and 342 so that the dead time DT substantially conforms to an interval resulting from subtracting a commutation period due to leakage from the transformer 301 from the delay time in the operation of the first and second rectifier transistors 341 and 342. The delay time in the operation of the first and second rectifier transistors 341 and 342 is defined by duration necessary from the time the gate-source voltage of the first and second rectifier transistors 341 and 342 falls below the threshold value until the first and second rectifier transistors are actually turned off.

When the dead time DT is set substantially conformable to an interval resulting from subtracting a commutation period due to leakage from the transformer 301 from the delay time in the operation of the first and second rectifier transistors 341 and 342, no through current flows into the first and second rectifier transistors 341 and 342 and current flowing into the body diodes of the first and second rectifier transistors 341 and 342 can be decreased as mush as possible.

At this time, the dead time DT may be set substantially longer than an interval resulting from subtracting a commutation period due to leakage from the transformer 301 from the delay time in the operation of the first and second rectifier transistors 341 and 342 so as to provide a margin. In this case, as current flows into the body diodes of the rectifier transistors 341 and 342 to the extent of the margin, the margin is preferably kept to a minimum.

With the arrangement above, in the switching power supply unit 330 according to this embodiment of the invention, the control signal S is caused to have the high level when a load having an operating voltage of 3.3V is driven and the control signal S is caused to have the low lever when the load having an operating voltage of 1.5V is driven, whereby any load can be driven. In this case, as the switching of the output voltage Vo (to 3.3V or 1.5V) is accomplished by switching operating frequencies in the half-bridge circuit 304, the load of the buck converter circuit 303 is prevented from being increased since it is unnecessary to raise the step-down level even when the requested output voltage Vo is set low.

In the switching power supply unit 330 according to this embodiment of the invention, the switching of the output voltage Vo is carried out by the switching of the operation of the half-bridge circuit and the output voltage Vo is stabilized through the operation of the buck converter circuit 303. As the buck converter circuit 303 and the half-bridge circuit 304 share their roles with each other, it is unnecessary to coordinate the operation of the buck converter circuit 303 with that of the half-bridge circuit closely, so that control complication can be restrained.

In the switching power supply unit 330 according to this embodiment of the invention, moreover, the current caused to flow into the body diodes of the rectifier transistors 341 and 342 can be decreased as much as possible while the generation of the through current is prevented by making the dead time DT of the half-bridge circuit 304 substantially conformable to the interval resulting from subtracting the commutation period due to the leakage from the transformer 301 from the delay time in the operation of the first and second rectifier transistors 341 and 342. Thus, the loss produced in the rectifier circuit 331 can effectively be suppressed.

It is further understood that the invention is not limited to the preferred embodiment of the invention as set forth above but may be subjected to various changes and modifications without departing from the scope of the invention and needless to say inclusive of these changes and modification as integral part of the claims thereof.

In the switching power supply unit 330 according to the above embodiment of the invention, though the buck converter circuit 303 and the half-bridge circuit 304 connected in series as the primary circuit of the transformer 301, for example, the invention is not limited to the use of such a primary circuit applicable to thereto but may be inclusive of other circuits connected in series. In place of the buck converter circuit 303, a boost converter circuit, a forward converter circuit, a full-bridge circuit, a push-pull circuit or any other circuit may be employed, for example.

In the switching power supply unit 330 according to the above embodiment of the invention, further, though the rectifier circuit including the first and second rectifier transistors 341 and 342 is used as the secondary circuit of the transformer 301, the invention is limited to the use of such a secondary circuit of the transformer 1 but may inclusive of other kinds of circuits, for example, a rectifier circuit using diodes, for example.

In the switching power supply unit 330 according to the above embodiment of the invention, further, though the 1-bit digital signal is used as the control signal S with the frequencies of the control pulses Vgs311 and Vgs312 set to f1 when the control signal S has the high level and with the frequencies of the control pulses Vgs311 and Vgs312 set to f2 (>f1) when the control signal S has the low level, a digital signal of 2 bits or greater may be used as the control signal S. In case where four kinds of output voltage Vo are selectable, the frequencies of the control pulses Vgs311 and Vgs312 may be set at four corresponding stages. In case where an analog signal is used as the control signal S with the output voltage Vo selectable linearly according its voltage value (or current value), the frequencies of the control pulses Vgs311 and Vgs312 may be set linearly.

As set forth above, it is possible to provide the switching power supply unit adapted to effectively prevent the generation of through currents according to the invention.

Further, the invention has the following effect:

(1) The first and second synchronous rectifying switch elements can surely be prevented from being simultaneously turned on and the leakage inductance of the transformer is minimized or otherwise the commutation period due to the leakage inductance is controllable in an optimum manner, whereby reliable, low-cost and low-loss switching power supply unit can be provided; and (2) As the low-loss switching power supply can be provided, the switching power supply unit becomes small-sized.

Furthermore, according to the invention, it is possible to provide a switching power supply unit wherein switching of the output voltage Vo can be carried out under a simple type of control and an increase in the loss generated in the rectifier circuit is suppressed.

What is claimed is:

1. A switching power supply unit comprising:

a transformer;

a first converter and a second converter which are connected between a supply input terminal and the primary winding of the transformer in series;

an output circuit connected to the secondary winding of the transformer; and a control circuit for controlling the operation of the first and second converters, wherein the control circuit is used for controlling the first converter in terms of duty and also controlling the second converter in terms of frequency.

2. The switching power supply unit as claimed in claim 1, wherein the control circuit controls the duty of the first converter according to a present output voltage outputted from the output circuit, and controls the operating frequency of the second converter according to a set value regardless of the present output voltage.

3. The switching power supply unit as claimed in claim 1, wherein the control circuit controls the second converter so that dead time is made constant, regardless of the operating frequency.

4. The switching power supply unit as claimed in claim 3, wherein the output circuit includes a self-drive type synchronous rectifier circuit formed with rectifier transistors is contained, wherein the dead time is set substantially equal to an interval resulting from subtracting a commutation period due to leakage inductance from the transformer from delay time in the operation of the rectifier transistors.

5. The switching power supply unit as claimed in claim 1, wherein the first converter is a buck converter circuit and the second converter is a half-bridge converter circuit.

* * * * *